(12) United States Patent
Kortz et al.

(10) Patent No.: US 7,820,868 B2
(45) Date of Patent: Oct. 26, 2010

(54) TRANSITION METAL SUBSTITUTED POLYOXOMETALATES AND PROCESS FOR THEIR PREPARATION

(75) Inventors: Ulrich Kortz, Bremen (DE); Sib Sankar Mal, Bremen (DE)

(73) Assignee: ExxonMobil Chemical Patents Inc., Houston, TX (US)

( * ) Notice: Subject to any disclaimer, the term of this patent is extended or adjusted under 35 U.S.C. 154(b) by 890 days.

(21) Appl. No.: 11/655,593

(22) Filed: Jan. 19, 2007

(65) Prior Publication Data

US 2008/0177118 A1 Jul. 24, 2008

(51) Int. Cl.
*C07C 15/02* (2006.01)
(52) U.S. Cl. .................... 585/400; 585/500; 585/706; 423/263; 423/463; 423/464
(58) Field of Classification Search .................. None
See application file for complete search history.

(56) References Cited

U.S. PATENT DOCUMENTS

| | | | |
|---|---|---|---|
| 4,196,136 A | 4/1980 | Knoth, Jr. | |
| 4,634,502 A | 1/1987 | Callahan et al. | |
| 4,839,008 A | 6/1989 | Hill | |
| 5,091,354 A | 2/1992 | Ellis, Jr. et al. | |
| 5,475,178 A | 12/1995 | Del Rossi et al. | |
| 5,616,815 A | 4/1997 | Atkins | |
| 5,629,459 A | 5/1997 | Atkins | |
| 5,684,216 A | 11/1997 | Haining | |
| 5,705,685 A | 1/1998 | Lyons et al. | |
| 5,714,429 A | 2/1998 | Haining | |
| 5,928,382 A | 7/1999 | Reinhardt et al. | |
| 5,990,348 A | 11/1999 | Lyons et al. | |
| 6,022,986 A | 2/2000 | Scharbert et al. | |
| 6,043,184 A | 3/2000 | Karmakar et al. | |
| 6,060,419 A | 5/2000 | Wijesekera et al. | |
| 6,114,274 A * | 9/2000 | Bordes et al. | 502/209 |
| 6,169,202 B1 * | 1/2001 | Wijesekera et al. | 562/549 |
| 6,387,841 B1 | 5/2002 | Devlin et al. | |
| 6,455,735 B1 | 9/2002 | Choudary et al. | |
| 6,518,216 B1 | 2/2003 | Han et al. | |
| 6,610,864 B2 * | 8/2003 | Krebs et al. | 549/531 |
| 6,664,408 B2 | 12/2003 | Peng et al. | |
| 6,673,733 B2 | 1/2004 | Fukumoto et al. | |
| 6,710,207 B2 | 3/2004 | Bogan, Jr. et al. | |
| 6,743,748 B2 | 6/2004 | Mizuno et al. | |
| 6,809,219 B2 | 10/2004 | Han et al. | |
| 7,019,165 B2 | 3/2006 | Davis et al. | |
| 7,097,858 B2 | 8/2006 | Hill et al. | |
| 7,358,380 B2 | 4/2008 | Kortz et al. | |
| 2002/0091275 A1 | 7/2002 | Krebs et al. | |
| 2002/0142914 A1 | 10/2002 | Devlin et al. | |
| 2002/0165405 A1 | 11/2002 | Peng et al. | |
| 2003/0017561 A1 | 1/2003 | Lee et al. | |
| 2003/0036473 A1 | 2/2003 | Busch et al. | |
| 2003/0109740 A1 | 6/2003 | Gotz et al. | |
| 2003/0144550 A1 | 7/2003 | Davis et al. | |
| 2003/0157012 A1 | 8/2003 | Pope et al. | |
| 2003/0171604 A1 | 9/2003 | Mizuno et al. | |
| 2003/0187297 A1 | 10/2003 | Bogan, Jr. et al. | |
| 2004/0185078 A1 | 9/2004 | Hill et al. | |
| 2004/0185116 A1 | 9/2004 | Hill et al. | |
| 2004/0210086 A1 | 10/2004 | Bogan, Jr. et al. | |
| 2005/0112055 A1 | 5/2005 | Shannon et al. | |
| 2006/0142620 A1 | 6/2006 | Deshpande et al. | |
| 2007/0027339 A1 | 2/2007 | Fullerton | |
| 2007/0093379 A1 | 4/2007 | Busch et al. | |

FOREIGN PATENT DOCUMENTS

| | | |
|---|---|---|
| EP | 0 442 663 | 8/1991 |
| EP | 0 955 284 | 11/1999 |
| EP | 1 059 276 | 12/2000 |
| EP | 1 077 082 | 2/2001 |
| EP | 1 078 687 | 2/2001 |
| EP | 1 201 636 | 5/2002 |
| EP | 1 213 280 | 9/2004 |

(Continued)

OTHER PUBLICATIONS

Stowe et al., {Magnetic properties of lone-pair-containing, sandwich-type polyoxoanions: A detailed study of the heteroatomic effect, European Journal of Inorganic Chemistry (2004), (19), 3792-3797}.*

(Continued)

*Primary Examiner*—Daniel M Sullivan
*Assistant Examiner*—Chukwuma O Nwaonicha
(74) *Attorney, Agent, or Firm*—Catherine L. Bell

(57) ABSTRACT

This invention relates to polyoxometalates represented by the formula $(A_n)^{m+}[M_y(H_2O)_pX_zZ_2W_{18}O_{66}]^{m-1}$ or solvates thereof, wherein A represents a cation acting as counterion of the polyanion, n is the number of the cations A, m is the charge of the polyoxoanion, M represents a transition metal selected from Cu, Zn, Pd, Pt and mixtures thereof, y is the number of transition metals M and is a number from greater than 4 to less than 6, p is a number of water molecules and is a number from 0 to 10, X is a halide selected from F, Cl, Br, I and mixtures thereof, z is a number of halides and is a number from 0 to 6 and Z represents a heteroatom selected from $Sb^{III}$, $Bi^{III}$, $As^{III}$, $Se^{IV}$ and $Te^{IV}$.

23 Claims, 1 Drawing Sheet

FOREIGN PATENT DOCUMENTS

| EP | 1 080 784 | 4/2005 |
|---|---|---|
| JP | 3349996 | 9/2002 |
| WO | WO 00/09262 | 2/2000 |
| WO | WO 03/028881 | 4/2003 |

OTHER PUBLICATIONS

Bi et al., {First Structurally Characterized Palladium(II)-Substituted Polyoxoanion: [Cs2Na(H2O)10Pd3( -SbIIIW9O33)2]9-, Inorganic Chemistry (2004), 43(13), 3915-3920}.*

Kortz et al., {Structure and Magnetism of the Tetra-Copper(II)-Substituted Heteropolyanion [Cu4K2(H2O)8( -AsW9O33)2]8-, Inorganic Chemistry (2004), 43(1), 144-154}.*

Adam et al., *A Highly Chemoselective, Diastereoselective, and Regioselective Epoxidation of Chiral Allylic Alcohols with Hydrogen Peroxide, Catalyzed by Sandwich-Type Polyoxometalates: Enhancement of Reactivity and Control of Selectivity by the Hydroxy Group through Metal-Alcoholate Bonding*, Journal of Org. Chem., 2003, vol. 68, No. 5, pp. 1721-1728.

Alam et al., *STM/STS Observation of Polyoxoanions on HOPG Surfaces: The Wheel-Shaped $[Cu_{20}Cl(OH)_{24}(H_2O)_{12}(P_8W_{48}O_{184})]^{25-}$ and the Ball-Shaped $[\{SN(CH_3)_2(H_2O)\}_{24}\{SN(CH_3)_2\}_{12}(A-PW_9O_{34})_{12}]^{36}$*, Inorganic Chemistry, 2006, vol. 45, No. 7, pp. 2866-2872.

Anderson et al., *A Palladium-Oxo Complex. Stabilization of This Proposed Catalytic Intermediate by an Encapsulating Polytungstate Ligand*, Journal of American Chemical Society, 2005, vol. 127, No. 34, pp. 11948-11949.

Anderson et al., *A Late-Transition Metal Oxo Complex: $K_7Na_9[O=Pt^{IV}(H_2O)L_2]$, $L=[PW_9O_{34}]9-$*, Science, 2004, vol. 306, pp. 2074-2077.

Angus-Dunne et al., *A Novel Heteropolymetalate Containing Palladium(II): Synthesis and Crystal Structure of $K_2Na_6[Pd_2W_{10}O_{36}]$ $22H_2O$*, Journal of Chemical Society, Chem. Commun 1994, pp. 523-524.

Bi et al., *Palladium(II)-Substituted Tungstosilicate $[Cs_2K(H_2O)_7Pd_2WO(H_2O)(A-\alpha-SiW_9O_{34})_2]^{9-}$*, Inorganic Chemistry, 2004, vol. 43, No. 26, pp. 8367-8372.

Böosing et al., *Highly Efficient Catalysts in Directed Oxygen-Transfer Processes: Synthesis, Structures of Novel Manganese-Containing Heteropolyanions, and Applications in Regioselective Epoxidation of Dienes with Hydrogen Peroxide*, J. Am. Chem. Soc., vol. 120, No. 29, 1998, pp. 7252-7259.

Bösing et al., *New Strategies for the Generation of Large Heteropolymetalate Clusters: The β-B-SbW₉Fragment as a Multifunctional Unit*, Chem. Eur. J., 1997, vol. 3, No. 8, pp. 1232-1237.

Cavani et al., *Combined effects of Sb-doping and of preparation via lacunary precursor for P/Mo-based, Keggin-type poloxometalates, catalysts for the selective oxidation of isobutane to methacrylic acid*, Topics in Catalysis, 2003, vol. 23, Nos. 1-4, pp. 119-124.

Cavani et al., *Improvement of catalytic performance in isobutane oxidation to methacrylic acid of Keggin-type phosphomolybdates by preparation via lacunary precursors: nature of the active sites*, Catalysis Letters, 2001, vol. 75, No. 1-2, pp. 99-105.

Cavani, *Heteropolycompound-based catalysts: A blend of acid and oxidizing properties*, Catalysis Today, 1998, vol. 41, pp. 73-86.

Contant et al., *A New Crown Heteropolyanion, $K_{28}Li_5H_7P_8W_{48}O_{184} \cdot 92H_2O$: Synthesis, Structure, and Properties*, Inorganic Chemistry, 1985, vol. 24, No. 26, pp. 4610-4614.

Contant et al., *Potassium Lithium Octatetracontatungstooctaphosphate, $K_{28}Li_5H_7[P_8W_{48}O_{184}] \cdot 92H_2O$*, Inorg. Synth., 1990, vol. 27, pp. 110-111.

Godin et al., *Coordination Chemistry of the Hexavacant Tungstophosphate $[H_2P_2W_{12}O_{48}]^{12-}$ with $Fe^{III}$ ions: Towards Original Structures of Increasing Size and Complexity*, Angew. Chem., Int. Ed., 2005, vol. 44, pp. 3072-3075.

Haber et al., *Catalytic performance of the dodecatungstophosphoric acid on different supports*, Applied Catalysis A: General 256, 2003, pp. 141-152.

Hu et al., *Homogeneous phase catalytic $H_2O_2$ oxidation of isobutyraldehyde using Keggin, Dawson and transition metal-substituted lacunary heteropolyanions*, Journal of Molecular Catalysis A: Chemical 184, 2002, pp. 451-464.

Hussain et al., *Tetrakis(dimethyltin)-Containing Tungstophosphate$[\{Sn(CH_3)_2\}_4(H_2P_4W_{24}O_{92})_2]^{28-}$:First Evidence for a Lacunary Preyssler Ion*, Inorganic Chemistry, 2006, vol. 45, No. 2 pp. 761-766.

Jabbour et al., *The wheel-shaped $Cu20$-tungstophosphate$[Cu_{20}Cl(OH)_{24}(H_2O)_{12}(P_8W_{48}O_{184})]^{25-}$, redox and electrocatalytic properties*, Electrochemistry Communications 7, 2005, pp. 841-847.

Kamat et al., *Efficient Epoxidation of Olefins with ≧99% Selectivity and Use of Hydrogen Peroxide*, Science, 2003, vol. 300, pp. 964-966.

Knoth, *Derivatives of Heteropolyanions. 2. Metal-Metal-Bonded Derivatives*, Journal of the American Chemical Society, 1979, vol. 101, No. 8, pp. 2211-2213.

Kortz et al., *Synthesis and Characterization of Iron(III)-Substituted, Dimeric Polyoxotungstates, $[Fe_4(H_2O)_{10}(\beta-XW_9O_{33})_2]^{n-}$ ($n=6$, $X=As^{III}, SB^{III}, n=4, X=Se^{IV}, Te^{IV}$)*, Inorganic Chemistry, 2002, vol. 41, No. 4, pp. 783-789.

Krebs et al., *Syntheses and Crystal Structure Studies of Novel Selenium- and Tellurium-Substituted Lacunary Polyoxometalates*, Polyoxometalate Chemistry, 2001, pp. 89-99.

Krebs et al., *Synthesis and Structural Chemistry of Novel Heteropolymolybdates and -tungstates*, Molecular Engineering 3, 1993, pp. 43-59.

Kuznestsova et al., *$O_2/H_2$Oxidation of Hydrocarbons on the Catalysts Prepared from Pd(II) Complexes with Heteropolytungstates*, 3rd World Congress on Oxidation Catalysis, 1997, pp. 1203-1211.

Lee et al., *Anhydrous octaguanidinium hexatungstoplatinate(IV)*, Acta Crystallographica Section E, Structure Reports Online, 2003, E59, pp. m116-m118.

Lee, *Dipotassium Hexahydrogen-α-hexamolybdoplatinate(IV) Pentahydrate, $K_2[H_6\alpha-PtMo_6O_{24}] \cdot 5H_2O$*, Acta Crystallographica Section C, 1994, C50, pp. 1657-1659.

Lee et al., *Synchrotron structure determination of an α-Keggin doubly $Pt^{IV}$-substituted silicotungstate, $(CH_6N_3)_8$ $[\alpha-SiPt_2-W_{10}O_{40}] \cdot 6H_2O$*, Acta Crystallographica Section C, 2003, C59, pp. m152-m155.

Lee et al., *The Geometrical Isomerization on Acidification in Hexamolydoheteropoly Oxometalate. The Crystal Structure of $(NH_4)_{4.5}[H_{3.5}\alpha-PtMo_6O_{24}] \cdot 1.5H_2O$, $(NH_4)_4[H_4\beta-PtMo_6O_{24}] \cdot 1.5H_2O$, and $K_{3.5}[H_{4.5}\alpha-PtMo_6O_{24}] \cdot 3H_2O$*, Bull. Korean Chem. Soc., 1994, vol. 15, No. 1, pp. 37-45.

Li et al., *Lacunary Keggin Polyoxotungstate as Reaction-controlled Phase-transfer Catalyst for Catalytic Epoxidation of Olefins*, Chinese Journal of Chemistry, 2004, vol. 22, No. 8, pp. 874-876.

Liu et al., *Wheel-Shaped Polyoxotungstate $[Cu_{20}Cl(OH)_{24}(H_2O)_{12}(P_8W_{48}O_{184})]^{25-}$ Macroanions Form Supramolecular "Blackberry" Structure in Aqueous Solution*, Journal of American Chemical Society, 2006, vol. 128, No. 31, pp. 10103-10110.

Loose et al., *Heteropolymetalate Clusters of the Subvalent Main Group Elements $Bi^{III}$ and $SB^{III}$*, Inorganic Chem., 1999, vol. 38, No. 11, pp. 2688-2694.

Mal et al., *The Wheel-Shaped $Cu_{20}$Tungstophosphate $[Cu_{20}Cl(OH)_{24}(H_2O)_{12}(P_8 W_{48}O_{184})]^{25-}$ Ion*, Angew. Chem. International Edition, 2005, vol. 44, pp. 3777-3780.

Misono et al., *Recent Progress in Catalytic Technology in Japan*, Applied Catalysis, 1990, vol. 64, pp. 1-30.

Misono, *Unique acid catalysis of heteropoly compounds (heteropolyoxometalates) in the solid state*, Chem. Commun., 2001, pp. 1141-1152.

Mizuno et al., *Heterogeneous Catalysis*, Chem. Rev., 1998, vol. 98, No. 1, pp. 199-217.

Neumann, *Polyoxometalate Complexes in Organic Oxidation Chemistry*, Progress in Inorganic Chemistry, 1998, vol. 47, pp. 317-370.

Neumann et al., *Hydroxylation of Alkanes with Molecular Oxygen Catalyzed by a New Ruthenium-Substituted Polyoxometalate, $[WZnRu_2^{III}(OH)(H_2O)(ZnW_9O_{34})_2]^{11-}$*, Angew. Chem. Int. Ed. Engl., 1995, vol. 34, No. 15 pp. 1587-1589.

Neumann et al., *Noble Metal (Ru$^{III}$, Pd$^{II}$, Pt$^{II}$) Substituted "Sandwich" Type Polyoxometalates: Preparation, Characterization, and Catalytic Activity in Oxidations of Alkanes and Alkenes by Peroxides*, Inorganic Chemistry, 1995, vol. 34, No. 23, pp. 5753-5760.

Neumann et al., *Molecular Oxygen Activation by a Ruthenium-Substituted "Sandwich" Type Polyoxometalate*, J. Am. Chem. Soc., 1998, vol. 120, No. 46, pp. 11969-11976.

Okun et al., $[(Fe^{III}(OH_2)_2)_3(A\text{-}\alpha\text{-}PW_9O_{34})_2]^{9-}$ *on Cationic Silica Nanoparticles, a New Type of Material and Efficient Heterogeneous Catalyst for Aerobic Oxidations*, Journal of American Chemical Society, 2003, vol. 125, No. 11, pp. 3194-3195.

Ratiu et al., *Synthesis and characterization of $K_{6[Ti]}(H_2O)P_2MoW_{16}O_{61}\cdot 17H_2O$, a Ti(IV) derivative of monolacunary Wells-Dawson 16-tungsto-molybdo-2-phosphate*, Polyhedron, 2002, vol. 21, pp. 353-358.

Rong et al., *Lacunary Polyoxometalate Anions Are π-Acceptor Ligands. Characterization of Some Tungstoruthenate(II,III,IV,V) Heteropolyanions and Their Atom-Transfer Reactivity*, J. Am. Chem. Soc., 1992, vol. 114, No. 8, pp. 2932-2938.

Rusu et al., *FT-IR, UV-VIS and EPR investigations of multicopper polyoxotungstates with Bi$^{III}$ as heteroatom*, Journal of Molecular Structure 563-564, 2001, pp. 427-433.

Rusu et al., *Spectroscopic and electron paramagnetic resonance behavior of trinuclear metallic clusters encapsulated in $[M^{n+}_3(H_2O)_x\text{-}(BiW_9O_{33})_2]^{(18-3n)-}$ heteropolyanion ($M^{n+}=(VO)^{II}$, x=0 and $M^{n+}=Cr^{III}$, $Mn^{II}$, $Fe^{III}$, $Co^{II}$, $Ni^{II}$, $Cu^{II}$, x=3)*, J. Chem. Soc., Dalton Trans., 2001, pp. 2879-2887.

Server-Carrio et al., *Synthesis, Characterization, and Catalysis of $\beta_3$-$[(Co^{II}O_4)W_{11}O_{31}(O_2)_4]^{10-}$ the First Keggin-Based True Heteropoly Dioxygen (Peroxo) Anion. Spectroscopic (ESR, IR) Evidence for the Formation of Superoxo Polytungstates*, J. Am. Chem. Soc., 1999, vol. 121, No. 5, pp. 977-984.

Sousa et al., *Novel cerium(IV) heteropolyoxtungstate containing two types of lacunary Keggin anions*, Chem. Commun, 2004, pp. 2656-2657.

Villanneau et al., *Co-ordination chemistry of lacunary Lindqvist-type polyoxometalates: cubic vs. square-antiprismatic co-ordination*, J. Chem. Soc., Dalton Trans., 1999, pp. 421-426.

Yin et al., *Autoxidation-Product-Initiated Dioxygenases: Vanadium-Based, Record Catalytic Lifetime Catechol Dioxgenase Catalysis*, Inorganic Chemistry, 2005, vol. 44, No. 23, pp. 8521-8530.

Zimmermann et al., *New Lanthanide-Containing Polytungstates Derived from the Cyclic $P_8W_{48}$Anion: $\{Ln_4(H_2O)_{28}(K\subset P_8W_{48}O_{184}(H_4W_4O_{12})_2Ln_2(H_2O)_{10}]^{13-}\}_x$, Ln=La, Ce, Pr, Nd*, Inorganic Chemistry, 2007, vol. 46, No. 5, pp. 1737-1740.

*First Structurally Characterized Palladium(II)-Substituted Polyoxoanion: $[Cs_2Na(H_2O)_{10}Pd_3(a\text{-}Sb^{III}W_9O33)_2]^{9-}$*; Li-Hua Bi et al.; Inorganic Chemistry 2004, vol. 43, No. 13, pp. 3915-3920.

*Magnetic Properties of Lone-Pair-Containing, Sandwich-Type Polyoxoanions: A Detailed Study of the Heteroatomic Effect*; by Ashley C. Stowe et al.; in Eur. J. Inorganic Chemistry (2004), pp. 3792-3797.

*The Palladium (II)-Substituted, Lone Pair Containing Tungstoarsenates(III) $[Na_2(H_2O)_2PdWO(H_2O)(a\text{-}AsW_9O_{33})]^{10-}$ and $[Cs_2Na(H_2O)_8Pd_3(a\text{-}AsW_9O_{33})_2]^{9-}$*; by Li-Hua Bi et al.; European Journal Inorganic Chemistry (2005), pp. 3034-3041.

*Synthesis and Characterization of Copper-, Zinc-, Manganese-, and Cobalt-Substituted Dimeric Heterogolyanions, $[(a\text{-}XW_9O_{33})_2M_3(H_2O)_3]^{n-}$ (n=12, X=As$^{III}$, Sb$^{III}$, M=$Cu^{2+}$, $Zn^{2+}$; n=10, X=Se$^{IV}$, Te$^{IV}$, M=$Cu^{2+}$) and $[(a\text{-}AsW_9O_{33})_2WO(H_2O)M_2(H_2O_2]^{10-}$ (M=$Zn^{2+}$, $Mn^2$, $CO^{2+}$)*; Kortz et al.; Inorganic Chemistry (2001), 40, pp. 4742-4749.

*Structure and Magnetism of the Tetra-Copper(II)-Substituted Heteropolyanion $[Cu_4K_2(H_2O)_8(a\text{-}AsW_9O_{33})_2]^{8-}$*; Kortz et al.; Inorganic Chemistry (2004), 43, 144-154.

*Ferromagnetic Exchange Interactions for $Cu6^{12+}$ and $Mn6^{12+}$ Hexagons Sandwiched by Two B-a- $[XW_9O_{33}]^{9-}$ (X=As$^{III}$ and Sb$^{III}$) Ligands in $D_{3d}$Symmetric Polyoxotungstates*; by Toshihiro Yamase et al.; Inorganic Chemistry (2006), 45, pp. 7698-7704.

*Observation of a Half Step Magnetization in the $\{Cu_3\}$-Type Triangular Spin Ring, Choi, K.-Y.*; by Matsuda, Y. H.; Nojiri, H.; Kortz, U.; Hussain, F.; Stowe, A. C.; Ramsey, C.; Dalal N. S. Physical Review Letters(week ending Mar. 17, 2006), PRL 96, 107202.

*The Wheel-Shaped Cu20-Tungstophosphate $[Cu_{20}Cl(OH)_{24}(H_2O)_{12}(P_8W_{48}O_{184})]^{25-}$ Ion, Mal, S. S.; Kortz, U. Angew. Chem. Int. Ed.* (2005), 44, pp. 3777-3780.

Synthesis and Structure of the Pentacopper(II) Substituted Tungstosilicate $[Cu_5(OH)_4(H_2O)_2(A\text{-}a\text{-}SiW_9O_{33})_2]^{10-}$, Bi, L.-H.; Kortz, U., *Inorganic. Chemistry* (2004), 43, pp. 7961-7962.

*Sandwich-type Germanotungstates: Structure and Magnetic Properties of the Dimeric Polyoxoanions $[M_4(H_2O)_2(GeW_9O_{34})_2]^{12-}$ (M=$Mn^{2+}$, $Cu^{2+}$, $Zn^{2+}$, $Cd^{2+}$)*. Kortz, U.; Nellutla, S.; Stowe, a. C.; Dalal, N. S.; Rauwald, U.; Danquah, W.; Ravot, D. Inorganic Chemistry(2004), 43, pp. 2308-2317.

*Sandwich-Type Silicotungstates: Structure and Magnetic Properties of the Dimeric Polyoxoanions $[\{SiM_2W_9O_{34}(H_2O)\}_2]^{12-}$(M=$Mn^{2+}$, $Cu^{2+}$, $Zn^{2+}$)*; by Kortz, U.; Isber, S.; Dickman, M. H.; Ravot, D. Inorganic Chemistry (2000), 39, pp. 2915-2922.

\* cited by examiner

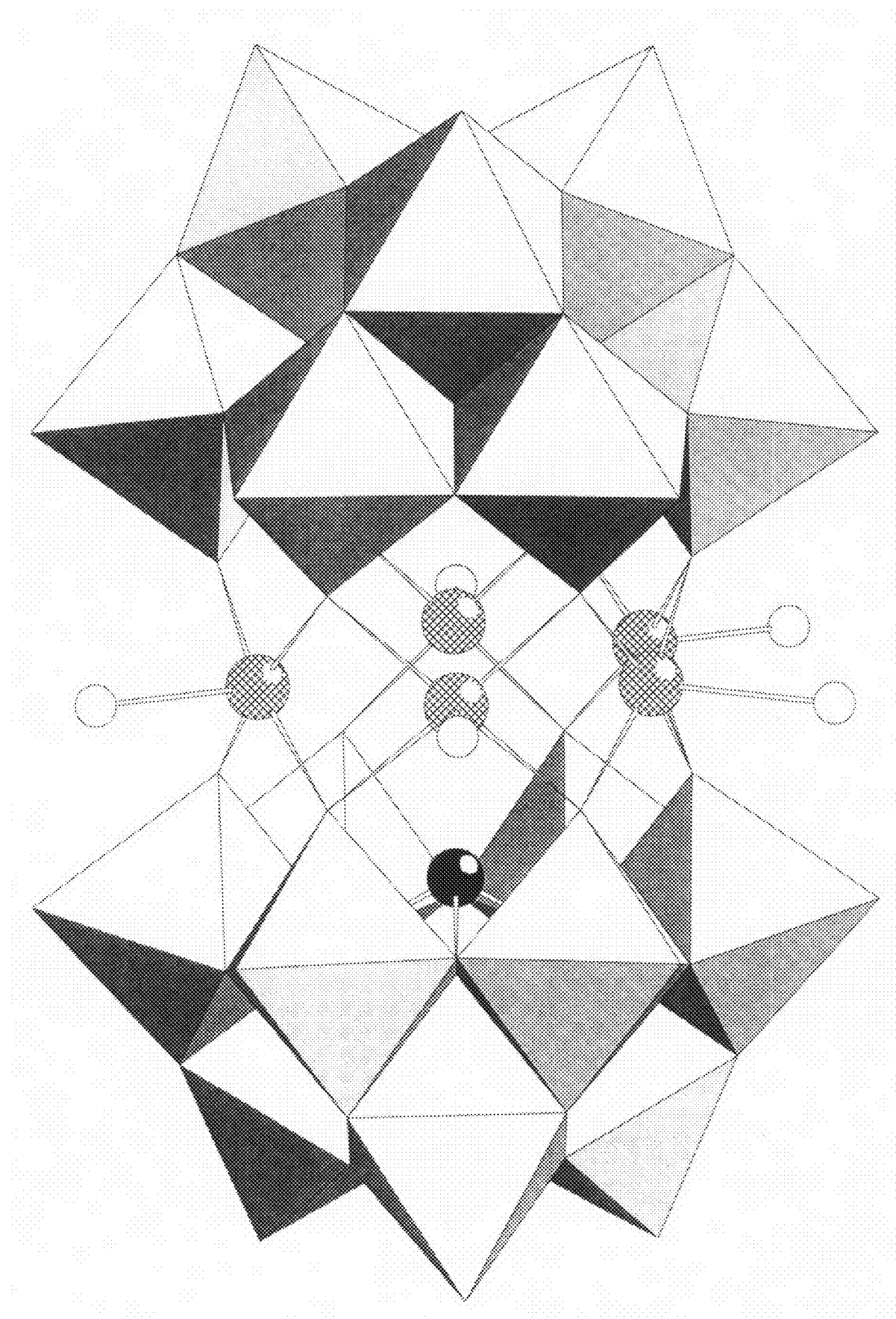

TRANSITION METAL SUBSTITUTED POLYOXOMETALATES AND PROCESS FOR THEIR PREPARATION

STATEMENT OF RELATED CASES

This application relates to U.S. Ser. No. 11/445,073, filed May 31, 2006, U.S. Ser. No. 11/443,683, filed May 31, 2006, and U.S. Ser. No. 11/445,095, filed May 31, 2006.

FIELD OF THE INVENTION

This invention relates to new copper-, zinc-, palladium- and/or platinum-substituted polyoxymetalates, a process for their preparation, and their use for the catalytic oxidation of organic molecules.

BACKGROUND OF THE INVENTION

Polyoxometalates (POMs) are a unique class of inorganic metal-oxygen clusters. They consist of a polyhedral cage structure or framework bearing a negative charge, which is balanced by cations that are external to the cage, and may also contain centrally located heteroatom(s) surrounded by the cage framework. Generally, suitable heteroatoms include Group IIIa to VIa elements such as phosphorus, antimony, silicon and boron. The framework of polyoxometalates typically comprises a plurality of metal atoms (addenda), which can be the same or different, bonded to oxygen atoms. Due to appropriate cation radius and good π-electron acceptor properties, the framework metal is generally limited to a few elements such as tungsten, molybdenum, vanadium, niobium and tantalum.

In the past, there have been increasing efforts towards the modification of polyoxoanions with various organic and/or transition metal complex moieties with the aim of generating new catalyst systems as well as functional materials with interesting optical, electronic and magnetic properties. In particular, transition metal substituted polyoxometalates (TMSPs) have attracted continuously growing attention as they can be rationally modified on the molecular level including size, shape, charge density, acidity, redox states, stability, solubility, etc.

For example, Kortz et al. report on the palladium(II)-substituted, dimeric, lone pair containing polyanion $[Cs_2Na(H_2O)_{10}Pd_3(\alpha\text{-}SbW_9O_{33})_2]^{9-}$ (Inorg. Chem. 2004, 43, 3915-3920). This polyanion was synthesized by reacting $Pd(CH_3COO)_2$ with $[\alpha\text{-}SbW_9O_{33}]^{9-}$ in aqueous acidic medium. The square-planar palladium(II) ions are located in the central belt of the sandwich-type structure connecting two ($\alpha\text{-}SbW_9O_{33}$) Keggin moieties via bonding to oxygen atoms of the $WO_6$ octahedra. The central belt of this polyoxometalate is completed by two $Cs^+$-ions and one $Na^+$-ion which occupy the vacancies between the palladium centers.

Moreover, Kortz et al. report on the palladium(II)-substituted, lone pair containing polyanion $[Cs_2Na(H_2O)_8Pd_3(\alpha\text{-}AsW_9O_{33})_2]^{9-}$ (Eur. J. Inorg. Chem. 2005, 3034-3041). This polyanion was synthesized by reacting $PdCl_2$ with $[\alpha\text{-}AsW_9O_{33}]^{9-}$ in aqueous acidic medium and can be considered as the As-analogue of the above mentioned $[Cs_2Na(H_2O)_{10}Pd_3(\alpha\text{-}SbW_9O_{33})_2]^{9-}$.

Further, Kortz et al. disclose the synthesis of the dimeric polyanions $[(\alpha\text{-}XW_9O_{33})_2M_3(H_2O)_3]^{12-}$ ($M=Cu^{2+}$, $Zn^{2+}$; $X=As^{III}$, $Sb^{III}$) (Inorg. Chem. 2001, 40, 4742-4749). Like the above palladium substituted POMs, also these polyanions belong to the class of Hervé-type sandwich POMs, i.e. they comprise two $[\alpha\text{-}XW_9O_{33}]$ units. The α-Keggin fragments of these polyanions are joined by three equivalent $Cu^{2+}$ or $Zn^{2+}$ ions each having one terminal water molecule resulting in square pyramidal coordination geometry. The addenda positions between the three transition metal ions are occupied by three sodium ions leading to a central belt of six metal atoms altering in position. In addition, Kortz et al., Inorg. Chem. 2004, 43, 144-154, describe the preparation of $\{K_7Na[Cu_4K_2(H_2O)_6(\alpha\text{-}AsW_9O_{33})_2]\cdot 5.5H_2O\}$. This polyanion consists of two ($\alpha\text{-}XW_9O_{33}$) units joined by a cyclic arrangement of four $Cu^{2+}$ and two $K^+$ ions, i.e. the central belt is composed of three adjacent, edge-shared $CuO_4(H_2O)$ square pyramides and a unique $CuO_4(H_2O)$ fragment which is separated from the copper triad by two potassium ions.

Furthermore, Yamase et al. describe the synthesis of $[(CuCl)_6(AsW_9O_{33})_2]^{12-}$ by replacement of a di-lanthanide moiety in $[\{Eu(H_2O)\}_2(AsW_9O_{33})_2]^{12-}$ with a $Cu_6$ hexagon (Inorg. Chem. 2006, 45, 7698-7704). The hexagon composed of penta-coordinated transition-metal-ions is found to be sandwiched by two $[B\text{-}\alpha\text{-}AsW_9O_{33}]^{9-}$ ligands.

Additional references of interest include:
1. Observation of a Half Step Magnetization in the $\{Cu_3\}$-Type Triangular Spin Ring, Choi, K.-Y.; Matsuda, Y. H.; Nojiri, H.; Kortz, U.; Hussain, F.; Stowe, A. C.; Ramsey, C.; Dalal N. S. Phys. Rev. Lett. 2006, 96, 107202.
2. The Wheel-Shaped $Cu_{20}$-Tungstophosphate $[Cu_{20}Cl(OH)_{24}(H_2O)_{12}(P_8W_{48}O_{184})]^{25-}$ Ion, Mal, S. S.; Kortz, U. Angew. Chem. Int. Ed. 2005, 44, 3777-3780.
3. Synthesis and Structure of the Penta-Copper(II) Substituted Tungstosilicate $[Cu_5(OH)_4(H_2O)_2(A\text{-}a\text{-}SiW_9O_{33})_2]^{10-}$, Bi, L.-H.; Kortz, U. Inorg. Chem. 2004, 43, 7961-7962.
4. Magnetic Properties of Lone Pair Containing, Sandwich-Type Polyoxoanions: A Detailed Study of the Heteroatom Effect Stowe, A. C.; Nellutla, S.; Dalal, N. S.; Kortz, U. Eur. J. Inorg. Chem. 2004, 3792-3797.
5. Sandwich-type Germanotungstates: Structure and Magnetic Properties of the Dimeric Polyoxoanions $[M_4(H_2O)_2(GeW_9O_{34})_2]^{12-}$ ($M=Mn^+$, $Cu^{2+}$, $Zn^{2+}$, $Cd^{2+}$). Kortz, U.; Nellutla, S.; Stowe, A. C.; Dalal, N. S.; Rauwald, U.; Danquah, W.; Ravot, D. Inorg. Chem. 2004, 43, 2308-2317.
6. Sandwich-Type Silicotungstates: Structure and Magnetic Properties of the Dimeric Polyoxoanions $[\{SiM_2W_9O_{34}(H_2O)\}_2]^{12-}$ ($M=Mn^{2+}$, $Cu^{2+}$, $Zn^{2+}$). Kortz, U.; Isber, S.; Dickman, M. H.; Ravot, D. Inorg. Chem. 2000, 39, 2915-2922.

However, up to now the known transition metal substituted polyanions have not turned out to be very useful for homogeneous or heterogeneous catalytic applications.

Therefore, it is an object of the present invention to provide transition metal substituted polyoxometalates which are useful as catalysts in homogeneous and heterogeneous oxidation reactions of organic substrates. Furthermore, such transition metal substituted POMs should be easy and reproducible to prepare.

These objects are achieved by polyoxometalates described herein.

SUMMARY OF THE INVENTION

This invention relates to polyoxometalates represented by the formula I:

$$(A_n)^{m+}[M_y(H_2O)_pX_zZ_2W_{18}O_{66}]^{m-} \quad (I)$$

or solvates thereof, wherein

A represents a cation, n is the number of the cations A, m is the charge of the polyoxoanion, M represents a transition metal(s) selected from Cu, Zn, Pd, Pt and mixtures thereof,
y is the number of transition metals M and is a number greater than 4 and less than 6,
p is the number of water molecules and is a number from 0 to 10,
X is a halide selected from the group consisting of F, Cl, Br, I and mixtures thereof,
z is the number of halides and is a number from 0 to 6, and
Z represents a heteroatom selected from the group consisting of $Sb^{III}$, $Bi^{III}$, $As^{III}$, $Se^{IV}$ and $Te^{IV}$.

BRIEF DESCRIPTION OF THE FIGURES

FIG. 1 is an illustration of the structure of a given polyanion according to the invention having 5 Cu(II) and one vacancy in the central belt.

DETAILED DESCRIPTION OF THE INVENTION

The CAS numbering scheme for the Periodic Table Groups is used as published in CHEMICAL AND ENGINEERING NEWS, 63 (5), 27 (1985).

This invention relates to polyoxometalates represented by the formula I:

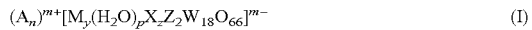
$$(A_n)^{m+}[M_y(H_2O)_pX_zZ_2W_{18}O_{66}]^{m-} \quad (I)$$

or solvates thereof, wherein
A represents a cation,
n is the number of the cations A,
m is the charge of the polyoxoanion,
M represents a transition metal selected from Cu, Zn, Pd, Pt and mixtures thereof, preferably Cu
y is the number of transition metals M and is a number greater than 4 and less than 6,
p is the number of water molecules and is a number from 0 to 10,
X is a halide selected from the group consisting of F, Cl, Br, I and mixtures thereof, preferably Cl,
z is the number of halides and is a number from 0 to 6, and
Z is a heteroatom selected from $Sb^{III}$, $Bi^{III}$, $As^{III}$, $Se^{IV}$ and $Te^{IV}$.

In some embodiments of POM molecules of the polyoxometalates according to the invention, the number y of transition metals M is 5. However, in alternate embodiments, based on all POM molecules of a given sample, the value of y is an average of the molecules in the sample and is greater than 4 and less than 6. For example, in the formulae above, the value of y can be 4.1, 4.2, 4.3, 4.4, 4.5, 4.6, 4.7, 4.8, 4.9, 5.0, 5.1, 5.2, 5.3, 5.4, 5.5, 5.6, 5.7, 5.8 or 5.9, with the value for y corresponding to mixtures of polyoxometalates typically having four or five or six transition metal centers. Mixtures of a polyoxometalate of formula I or a solvate thereof having five transition metals with polyoxometalates of formula I or solvates thereof having four transition metals are particularly preferred so that the value of y is preferably greater than 4 and less than 5. More preferably, the value of y is about 4.3, 4.4 or 4.5. Most preferably, the average value of y is about 4.5. According to another embodiment of the invention, substantially all polyoxometalate molecules of a given sample have 5 transition metal centers. For this embodiment not only is the value of y equal to 5 for a given sample, but also for each POM molecule the individual value of y is 5. By substantially all is meant that y is 5 in at least 95% of the POM molecules in a given sample.

This invention also relates to heterogeneous or homogeneous polyoxometalate compositions represented by the formula I (above) and a process to make heterogeneous or homogeneous polyoxometalate compositions represented by formula II (below), as well as process to use these polyoxometalates to polymerize olefins. For purposes of this invention and the claims thereto a heterogeneous polyoxometalate composition is a mixture of polyoxometalates having different numbers (i.e. 4, 5 or 6) of transition metal centers, and a homogeneous polyoxometallate composition is a mixture of polyoxometalates having the same number of transition metal centers. Typically, in formulae I and II y is a number greater than 4 and less than 6 when the composition is heterogeneous and is 5 when the composition is homogeneous; however, one should also note that a heterogeneous POM composition can have a y of 5.

One of ordinary skill in the art will recognize that the formulae described above may represent a single species of POM molecule or a given sample containing multiple different POM molecules and as such the values for m, n, y, p, and z may or may not be whole numbers. When y is a whole number, it is clear to one of ordinary skill in the art that y represents a single type of POM molecule. When y is not a whole number, it is clear to one of ordinary skill in the art that y represents an average of all polyoxometalate molecules of a given sample. In addition when the phrase "is a number from" is used it is meant to encompass and disclose all numbers between the two values to one digit past the decimal point. For example the phrase "is a number from 0 to 1" discloses 0, 0.1, 0.2, 0.3, 0.4, 0.5, 0.6, 0.7, 0.8, 0.9, and 1.0.

In a preferred embodiment, the transition metal M is Cu. In another preferred embodiment, the halide X is Cl. In yet another preferred embodiment, the halide X is Cl and the transition metal M is Cu.

The polyanion $[M_y(H_2O)_pX_zZ_2W_{18}O_{66}]^{m-}$ of the polyoxometalates described above has been found to exist in a Hervé-type structure, i.e. it is a dimeric POM comprising two trilacunary Keggin fragments $\alpha\text{-}[ZW_9O_{33}]^{p-}$ (where Z is a heteroatom selected from $Sb^{III}$, $Bi^{III}$, $As^{III}$, $Se^{IV}$ and $Te^{IV}$.) which are connected by a central belt consisting of six addenda positions. These six addenda positions are occupied by transition metals M. In accordance with the definition of y, on average more than 4 but less than 6 addenda positions are occupied by M. Since not all six addenda positions are occupied by M, vacancies in the central belt result. Optionally, these vacancies can be occupied by cations A. In the case where the transition metal M is Cu and/or Zn, each M has one terminal water ligand resulting in a central belt comprising $MO_4(H_2O)$ square pyramids. In the case where the transition metal M is Pd(II) or Pt(II), it is coordinated in a square-planar fashion, i.e. no terminal water ligands are bound to M. As an illustration, the structure of a preferred polyanion having 5 Cu(II) and one vacancy in the central belt is depicted in FIG. 1. Each Cu(II) is ligated with one terminal water molecule or one terminal halide such as chloride.

As water and halide ligands can be substituted easily, the polyoxometalates of the invention allow an easy generation of free coordination sites at the catalytically active transition metal M. Consequently, the metal centers are readily accessible for other ligands including organic substrates and oxygen donor species such as $O_2$, $H_2O_2$, organic peroxides (e.g. $t\text{-}(C_4H_9)OOH$) or peracids (e.g. $CH_3COOOH$) which in turn improve the catalytic performance in oxidation reactions. In addition, the presence of vacancies in the central belt of the present POMs even enhances this accessibility.

The cation A (in Formula I above) is typically a Group Ia, IIa, IIIb, IVb, Vb, VIIb, VIIb, VIIIb, Ib, IIb, IIIa, IVa, Va and VIa metal or an organic cation. In a preferred embodiment, A is selected from the group consisting of lithium, sodium, potassium, rubidium, cesium, magnesium, calcium, strontium, barium, titanium, vanadium, chromium, lanthanum, lanthanide metal, actinide metal, manganese, iron, cobalt, nickel, copper, zinc, ruthenium, palladium, platinum, tin, antimony, tellurium, phosphonium such as tetraalkylphosphonium, ammonium, guanidinium, tetraalkylammonium, protonated aliphatic amines, protonated aromatic amines or combinations thereof. More preferably, A is selected from sodium, potassium, ammonium and combinations thereof. Generally, A acts as counterion of the polyanion and is therefore positioned outside of the POM framework. However, it is also possible that one or more cations A can occupy a vacancy of the central belt and thus take a position within the framework of the polyanion.

The number n of cations is dependent on the nature of cation(s) A, namely its/their valence, and the negative charge m of the polyanion which has to be balanced. In any case, the overall charge of all cations A is equal to the charge of the polyanion. In turn, the charge m of the polyanion is dependent on the oxidation state and the number of the transition metals M, the oxidation state of the heteroatom Z, the oxidation state of transition metal M as well as the number of halides z. In some embodiments m is 1, 2, 3, 4, 5, 6, 7, 8, 9, 10, 11, or 12 for a given POM molecule. Preferably m is a number from 1 to 12. Accordingly, based on all POM molecules of a given sample values of m of more than 1 and less than 12 such as 9.5 or 10 can be obtained. In some embodiments, n is 1, 2, 3, 4, 5, 6, 7, 8, 9, 10, 11, or 12 for a given POM molecule. Accordingly, the value of n for a given sample can be more than 1 and less than 12, e.g. 9.5 or 10. Preferably n is a number from 1 to 12.

The oxidation state of M comprised in the present polyoxometalates can range from (I) to (IV) and preferably is (II). In a preferred embodiment the transition metal M is copper, preferably copper (II). It is also possible that in a given POM molecule M is a mixture of Cu, Zn, Pd and/or Pt, i.e. that the six addenda positions in the central belt are occupied by different transition metals, for example 1 Pd and 4 Cu, 2 Pd and 3 Cu, 3 Pd and 2 Cu, etc.

The water molecules which can be present in polyoxometalates according to the invention are bound to M and optionally to one or more cations A occupying an addenda position of the framework. The number p of water molecules bound to M and/or A depends on the number and nature of transition metal M and is 1 for each Cu and Zn center incorporated in the central belt, but is 0 for each palladium and platinum center. Moreover, p depends on the number and nature of cations A occupying an addenda position. For example, each potassium ion will usually bear two water ligands. Finally, p depends on the number z of halides such as chloride ions since halides are ligated to Cu and/or Zn centers instead of water. In a preferred embodiment, p is a number from 0 to 10 and can for example be 3, 4 or 5.

The halides X which can be present in the polyoxometalates according to the invention are bound to M or optionally, especially in the solid state, to a cation A located in the central belt of the POM. Typically, the halides X are bound to M. In a further preferred embodiment, chloride is used as halide X.

The number z of halides is a number from 0 to 6 and for example is 0, 1 or 2. Generally, the presence of halides such as chloride ligands instead of water ligands bound to the transition metal centers M increases the negative charge of the polyanion. In some embodiments, the negative charge of the polyanion might become too low and thus the polyanion might become too unstable if the number y of transition metals increases. Hence, in a preferred embodiment, the number z of halides increases with the number of transition metals incorporated into the central belt of the polyanion.

The heteroatom Z of the polyoxometalates according to the invention is advantageously selected from As, Sb and Bi and is preferably Sb.

Accordingly, suitable examples of polyoxometalates according to the invention are represented by the formulae:

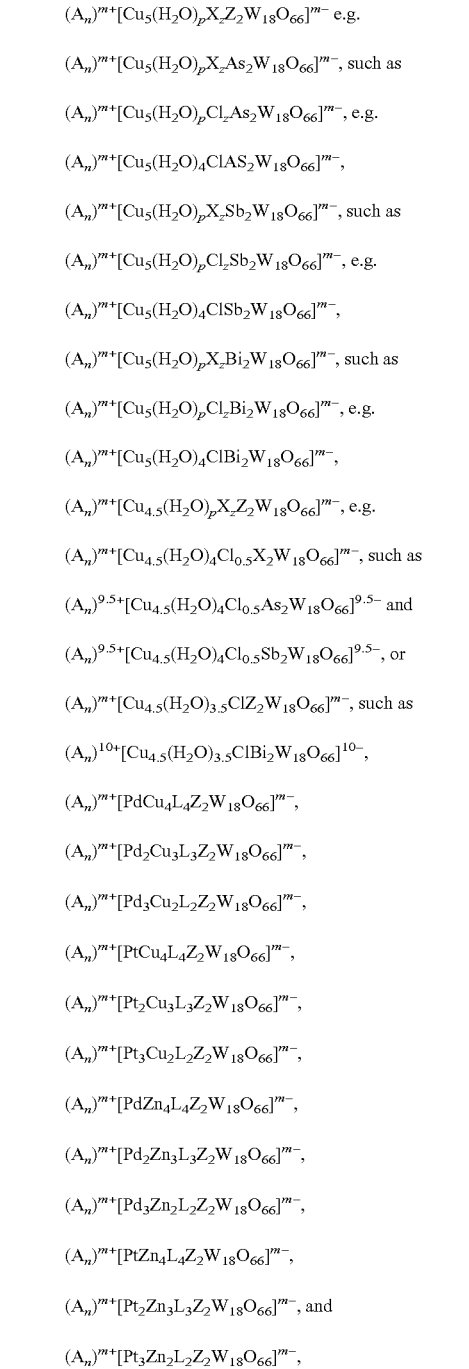

$(A_n)^{m+}[Cu_5(H_2O)_pX_zZ_2W_{18}O_{66}]^{m-}$ e.g.

$(A_n)^{m+}[Cu_5(H_2O)_pX_zAs_2W_{18}O_{66}]^{m-}$, such as $(A_n)^{m+}[Cu_5(H_2O)_pCl_zAs_2W_{18}O_{66}]^{m-}$, e.g.

$(A_n)^{m+}[Cu_5(H_2O)_4ClAs_2W_{18}O_{66}]^{m-}$, $(A_n)^{m+}[Cu_5(H_2O)_pX_zSb_2W_{18}O_{66}]^{m-}$, such as $(A_n)^{m+}[Cu_5(H_2O)_pCl_zSb_2W_{18}O_{66}]^{m-}$, e.g.

$(A_n)^{m+}[Cu_5(H_2O)_4ClSb_2W_{18}O_{66}]^{m-}$, $(A_n)^{m+}[Cu_5(H_2O)_pX_zBi_2W_{18}O_{66}]^{m-}$, such as $(A_n)^{m+}[Cu_5(H_2O)_pCl_zBi_2W_{18}O_{66}]^{m-}$, e.g.

$(A_n)^{m+}[Cu_5(H_2O)_4ClBi_2W_{18}O_{66}]^{m-}$, $(A_n)^{m+}[Cu_{4.5}(H_2O)_pX_zZ_2W_{18}O_{66}]^{m-}$, e.g.

$(A_n)^{m+}[Cu_{4.5}(H_2O)_4Cl_{0.5}X_2W_{18}O_{66}]^{m-}$, such as $(A_n)^{9.5+}[Cu_{4.5}(H_2O)_4Cl_{0.5}As_2W_{18}O_{66}]^{9.5-}$ and $(A_n)^{9.5+}[Cu_{4.5}(H_2O)_4Cl_{0.5}Sb_2W_{18}O_{66}]^{9.5-}$, or $(A_n)^{m+}[Cu_{4.5}(H_2O)_{3.5}ClZ_2W_{18}O_{66}]^{m-}$, such as $(A_n)^{10+}[Cu_{4.5}(H_2O)_{3.5}ClBi_2W_{18}O_{66}]^{10-}$, $(A_n)^{m+}[PdCu_4L_4Z_2W_{18}O_{66}]^{m-}$, $(A_n)^{m+}[Pd_2Cu_3L_3Z_2W_{18}O_{66}]^{m-}$, $(A_n)^{m+}[Pd_3Cu_2L_2Z_2W_{18}O_{66}]^{m-}$, $(A_n)^{m+}[PtCu_4L_4Z_2W_{18}O_{66}]^{m-}$, $(A_n)^{m+}[Pt_2Cu_3L_3Z_2W_{18}O_{66}]^{m-}$, $(A_n)^{m+}[Pt_3Cu_2L_2Z_2W_{18}O_{66}]^{m-}$, $(A_n)^{m+}[PdZn_4L_4Z_2W_{18}O_{66}]^{m-}$, $(A_n)^{m+}[Pd_2Zn_3L_3Z_2W_{18}O_{66}]^{m-}$, $(A_n)^{m+}[Pd_3Zn_2L_2Z_2W_{18}O_{66}]^{m-}$, $(A_n)^{m+}[PtZn_4L_4Z_2W_{18}O_{66}]^{m-}$, $(A_n)^{m+}[Pt_2Zn_3L_3Z_2W_{18}O_{66}]^{m-}$, and $(A_n)^{m+}[Pt_3Zn_2L_2Z_2W_{18}O_{66}]^{m-}$, wherein L is a ligand bound to the transition metal M selected from $H_2O$ or X (where X is a halide selected from the group consisting of F, Cl, Br, I and mixtures thereof, preferably Cl), and wherein A, n, m, p, z, and Z are as described above.

The invention also includes solvates of the POMs described herein. A solvate is an association of solvent molecules with a polyoxometalate. Preferably, water is associated with the POMs and thus, POMs useful herein can be represented by the formula $(A_n)^{m+}[M_y(H_2O)_pX_zZ_2W_{18}O_{66}]^{m-}\cdot xH_2O$, such as $(A_n)^{m+}[Cu_y(H_2O)_pX_zZ_2W_{18}O_{66}]^{m-}\cdot xH_2O$, wherein x represents the number of hydrate water molecules per POM molecule, exclusive of the water molecules which are bound as ligands to M or optionally A positioned in the framework, and mostly depends on the type of cations A (and wherein A, n, m, M, y, p, X, z, Z, are as described above). In some embodiments x is an integer from 1 to 50 such as 2, 4, 5, 6, 8, 10, 11, 12, 16, 18, 20, 22, 24, 25, 26, or 30.

Suitable examples of polyoxometalate solvates according to the invention are represented by the formulae:

$(A_n)^{m+}[Cu_5(H_2O)_pX_zZ_2W_{18}O_{66}]^{m-}\cdot xH_2O$, e.g.

$(A_n)^{m+}[Cu_5(H_2O)_pX_zAs_2W_{18}O_{66}]^{m-}\cdot xH_2O$, such as $(A_n)^{m+}[Cu_5(H_2O)_pCl_zAs_2W_{18}O_{66}]^{m-}\cdot xH_2O$, e.g.

$(A_n)^{m+}[Cu_5(H_2O)_4ClAs_2W_{18}O_{66}]^{m-}\cdot xH_2O$, $(A_n)^{m+}[Cu_5(H_2O)_pX_zSb_2W_{18}O_{66}]^{m-}\cdot xH_2O$, such as $(A_n)^{m+}[Cu_5(H_2O)_pCl_zSb_2W_{18}O_{66}]^{m-}\cdot xH_2O$, e.g.

$(A_n)^{m+}[Cu_5(H_2O)_4ClSb_2W_{18}O_{66}]^{m-}\cdot xH_2O$, $(A_n)^{m+}[Cu_5(H_2O)_pX_zBi_2W_{18}O_{66}]^{m-}\cdot xH_2O$, such as $(A_n)^{m+}[Cu_5(H_2O)_pCl_zBi_2W_{18}O_{66}]^{m-}\cdot xH_2O$, e.g.

$(A_n)^{m+}[Cu_5(H_2O)_4ClBi_2W_{18}O_{66}]^{m-}\cdot xH_2O$, $(A_n)^{m+}[Cu_{4.5}(H_2O)_pX_zZ_2W_{18}O_{66}]^{m-}\cdot xH_2O$, e.g.

$(A_n)^{m+}[Cu_{4.5}(H_2O)_4Cl_{0.5}X_2W_{18}O_{66}]^{m-}\cdot xH_2O$, such as $(A_n)^{9.5+}[Cu_{4.5}(H_2O)_4Cl_{0.5}As_2W_{18}O_{66}]^{9.5-}\cdot xH_2O$, $Na(NH_4)_{8.5}[Cu_{4.5}(H_2O)_4Cl_{0.5}As_2W_{18}O_{66}]\cdot 11H_2O$, $(A_n)^{9.5+}[Cu_{45}(H_2O)_4Cl_{0.5}Sb_2W_{18}O_{66}]^{9.5}\cdot xH_2$, $Na(NH_4)_{8.5}[Cu_{4.5}(H_2O)_4Cl_{0.5}Sb_2W_{18}O_{66}]\cdot 11H_2O$, or $(A_n)^{m+}[Cu_{4.5}(H_2O)_{3.5}ClZ_2W_{18}O_{66}]^{m-}\cdot xH_2O$, such as $(A_n)^{10+}[Cu_{4.5}(H_2O)_{3.5}ClBi_2W_{18}O_{66}]^{10-}\cdot xH_2O$, and $Na_3(NH_4)_7[Cu_{4.5}(H_2O)_{3.5}ClBi_2W_{18}O_{66}]^{10-}\cdot 6H_2O$, $(A_n)^{m+}[PdCu_4L_4Z_2W_{18}O_{66}]^{m-}\cdot xH_2O$, $(A_n)^{m+}[Pd_2Cu_3L_3Z_2W_{18}O_{66}]^{m-}\cdot xH_2O$, $(A_n)^{m+}[Pd_3Cu_2L_2Z_2W_{18}O_{66}]^{m-}\cdot xH_2O$, $(A_n)^{m+}[PtCu_4L_4Z_2W_{18}O_{66}]^{m-}\cdot xH_2O$, $(A_n)^{m+}[Pt_2Cu_3L_3Z_2W_{18}O_{66}]^{m-}\cdot xH_2O$, $(A_n)^{m+}[Pt_3Cu_2L_2Z_2W_{18}O_{66}]^{m-}\cdot xH_2O$, $(A_n)^{m+}[PdZn_4L_4Z_2W_{18}O_{66}]^{m-}\cdot xH_2O$, $(A_n)^{m+}[Pd_2Zn_3L_3Z_2W_{18}O_{66}]^{m-}\cdot xH_2O$, $(A_n)^{m+}[Pd_3Zn_2L_2Z_2W_{18}O_{66}]^{m-}\cdot xH_2O$, $(A_n)^{m+}[PtZn_4L_4Z_2W_{18}O_{66}]^{m-}\cdot xH_2O$, $(A_n)^{m+}[Pt_2Zn_3L_3Z_2W_{18}O_{66}]^{m-}\cdot xH_2O$, and $(A_n)^{m+}[Pt_3Zn_2L_2Z_2W_{18}O_{66}]^{m-}\cdot xH_2O$.

Wherein A, n, m, p, X, z, Z, L, and x are as described above.

The invention is further directed to a process for preparing polyoxometalates of formula (II):

$$(A_n)^{m+}[M_y(H_2O)_pX_zZ_2W_{18}O_{66}]^{m-} \qquad (II)$$

or solvates thereof, wherein
   A represents a cation,
   n is the number of the cations A,
   m is the charge of the polyoxoanion,
   M represents a transition metal selected from Cu, Zn, Pd, Pt and mixtures thereof,
   y is the number of transition metals M and is a number from greater than 4 to less than or equal to 6, alternately y is greater than 4 and less than 6, preferably y is about 5,
   p is the number of water molecules and is a number from 0 to 10,
   X is a halide selected from the group consisting of F, Cl, Br, I and mixtures thereof,
   z is the number of halides and is a number from 0 to 6 and
   Z is a heteroatom selected from $Sb^{III}$, $Bi^{III}$, $As^{III}$, $Se^{IV}$ and $Te^{IV}$, comprising:
   (a) mixing an aqueous solution of a source of M with
      (i) a salt of $(\alpha\text{-}ZW_9O_{33})^{w-}$ or
      (ii) a Z containing starting material and a salt of $WO_4^{2-}$,
   (b) heating the mixture obtained in step (a),
   (c) optionally cooling the solution obtained in step (b),
   (d) optionally adding a salt of A and/or a salt of X to the mixture of step (a) or the solution obtained in step (b) or in step (c) to form $(A_n)^{m+}[M_y(H_2O)_pX_zZ_2W_{18}O_{66}]^{m-}$ or a solvate thereof, and
   (e) optionally recovering the polyoxometalate obtained in step (b), step (c) or step (d), wherein w is the negative charge of the POM-precursor $(\alpha\text{-}ZW_9O_{33})$ and is 9 when $Z=Sb^{III}$, $Bi^{III}$, $As^{III}$ and 8 when $Z=Se^{IV}$, $Te^{IV}$, respectively.

According to a preferred embodiment, polyoxometalates of formula (I) (i.e. where y is greater than 4 and less than 6) are prepared.

In step (a) of the process above a source of M is used. Generally, $M^{2+}$ salts such as $CuCl_2\cdot 2H_2O$, $Cu(CH_3COO)_2$, $ZnCl_2$, $PdCl_2$, $Pd(CH_3COO)_2$, $PdSO_4$, $PtCl_2$, $PtBr_2$, $PtI_2$ and $K_2PtCl_4$ can be used as a transition metal source. In a preferred embodiment, the Cu source is $CuCl_2\cdot 2H_2O$, and/or the Zn source is $ZnCl_2$, and/or the Pd source is $PdCl_2$ and/or the Pt source is $PtCl_2$. In another preferred embodiment, the Cu source is $CuCl_2\cdot 2H_2O$, and the Zn source is $ZnCl_2$, and the Pd source is $PdCl_2$ and the Pt source is $PtCl_2$.

This transition metal source is preferably mixed with (i) a salt of $(\alpha\text{-}ZW_9O_{33})^{w-}$ or (ii) a Z containing starting material, such as $Z_2O_3$ or $H_2ZO_3$ (e.g. $Sb_2O_3$, $Bi_2O_3$, $H_2SeO_3$) or a salt of $Z^{3+}$ or $Z^{4+}$, and a salt of $WO_4^{2-}$ (where Z is selected from $Sb^{III}$, $Bi^{III}$, $As^{III}$, $Se^{IV}$ and $Te^{IV}$). It is convenient to react the transition metal source with (i) a salt of polyoxometalate precursor $(\alpha\text{-}ZW_9O_{33})^{w-}$. It has been found that the course of this reaction can be controlled by various parameters such as pH of the aqueous solution, concentration and ratio of the starting materials and the counterions used in step (a) as well as the reaction temperature used in step (b).

Advantageously, the pH of the aqueous solution used in step (a) is a number from 4.5 to 7.5, alternately from 4.5 to 6.5 and preferably from 4.5 to 5.5. A pH of about 4.8 is particularly useful. Generally, a buffer solution can be used for adjusting the pH. It is particularly useful to select an ammonium acetate buffer having a concentration of 0.5 M and a pH of about 4.8 as an aqueous solvent.

In addition, the ratio of the starting materials is considered to have an effect on the preparation of the present POMs. In a preferred embodiment, the molar ratio of the transition metal ions originating from the transition metal source to the salt of $(\alpha\text{-}ZW_9O_{33})^{w-}$ ranges from 1.5:1 to 30:1 and preferably from 2:1 to 15:1.

Suitable cations in the salts of the polyanion $(\alpha\text{-}ZW_9O_{33})^{w-}$ used in step (a) are for example lithium, sodium, potassium, ammonium, guanidinium, tetraalkylammonium, protonated aliphatic amines and protonated aromatic amines. It has been found that when alkaline metals such as sodium or potassium are present in the reaction mixture of step (a), these cations may occupy some of the addenda positions of the central belt of the resulting polyanion. Thus, in order to prepare polyoxometalates having a high level of transition metal centers, e.g. 5 Cu centers incorporated per POM molecule, it is advisable to avoid alkaline metals and use the ammonium salt of $(\alpha\text{-}ZW_9O_{33})^{w-}$ in step (a). Consequently, it is advantageous if steps (a) and (b) of the process according to the invention are performed in the absence of alkali ions. If alkali ions are nevertheless present during step (a) and (b), then it is preferred to use sodium.

Moreover, in step (a) it is advantageous that the salt of $(\alpha\text{-}ZW_9O_{33})^{w-}$ is added to an aqueous solution of the transition metal source. It is particularly advantageous that this addition is performed quickly.

In step (b), the mixture obtained in step (a) is typically heated to a reaction temperature of 50 to 100° C., preferably 70 to 90° C. Depending on the size of the batch the heating step may be performed for about 30 to about 120 min or longer, typically for about 45 to 75 minutes, usually for about 60 min.

Optionally, in step (c) the heated reaction mixture of step (b) is cooled, typically to room temperature (approx 23° C.), and optionally filtered.

Furthermore, in step (d) a salt of the cation A and/or a salt of X can be added to the mixture of step (a) or to the solution obtained in step (b) or step (c) or, in case of filtration in step (c), to its filtrate to form $(A_n)^{m+}[M_y(H_2O)_pX_zZ_2W_{18}O_{66}]^{m-}$ (where A, n, m, M, y, p, X, z, and Z are defined above in formula II). In a preferred embodiment, the salt of A and/or the salt of X is added as a solid or in the form of an aqueous solution. The counterions of A can be selected from the group consisting of any stable, nonreducing, water soluble anion, e.g. halides, nitrate, sulfate, acetate. In a preferred embodiment, the chloride salt is used. The counterions of X can be selected from alkali or ammonium. However, the addition of extra cations A and/or extra halides in step (d) is not necessary if the desired cations and halides are already present during step (a), for example as a counterion of $(\alpha\text{-}ZW_9O_{33})^{w-}$ or a component of the transition metal source. In some embodiments, all desired cations and anions are already present during step (a) and thus step (d) is preferably not performed.

In step (e), the polyoxometalates according to the invention formed in step (b), (c) or (d) can be recovered. For example, isolation and recovery of the POMs can be effected by common techniques including bulk precipitation or crystallization.

The polyoxometalates described herein (and their solvates) are preferably used for catalyzing homogeneous and heterogeneous oxidation reactions of organic substrates. Specifically in a preferred embodiment this invention relates to a process to oxidize organic substrates comprising contact one or more organic substrates with a polyoxometalate represented by the formula:

$$(A_n)^{m+}[M_y(H_2O)_pX_zZ_2W_{18}O_{66}]^{m-} \quad (II)$$

or solvates thereof, wherein
A represents a cation,
n is the number of the cations A,
m is the charge of the polyoxoanion,
M represents a transition metal selected from Cu, Zn, Pd, Pt and mixtures thereof,
y is the number of transition metals M and is a number greater than 4 and less than or equal to 6,
p is the number of water molecules and is a number from 0 to 10,
X is a halide selected from the group consisting of F, Cl, Br, I and mixtures thereof,
z is the number of halides and is a number from 0 to 6 and
Z represents a heteroatom selected from $Sb^{III}$, $Bi^{III}$, $As^{III}$, $Se^{IV}$ and $Te^{IV}$.

Preferably, polyoxometalates of formula (I) (i.e. where y is greater than 4 and less than 6) can be used for catalyzing homogeneous and heterogeneous oxidation reactions of organic substrates.

In particular, the present POMs can be used for oxidizing un-substituted and substituted hydrocarbons such as branched or unbranched alkanes and alkenes having carbon numbers from C1 to C20 (preferably from C1 to C6), cycloalkanes, cycloalkenes, aromatic hydrocarbons or mixtures thereof. Examples of suitable organic substrates are methane, ethane, propane, butane, isobutane, pentane, isopentane, neopentane, hexane, ethylene, propylene, α-butylene, cis-β-butylene, trans-β-butylene, isobutylene, n-pentylene, isopentylene, cyclohexane, adamantane, cyclooctadiene, benzene, toluene, o-xylene, m-xylene, p-xylene, mesitylene, durene, hexamethylbenzene, naphthalene, anthracene, phenantrene and mixtures thereof.

Since their terminal water ligands are substitution labile, the coordination sites of the transition metals are easily accessible to the organic substrate and the oxygen transfer molecule and therefore high catalytic activities are achieved. Further, the remarkable thermal stability of the polyoxoxmetalates permits their use under a great variety of reaction conditions.

Commonly, suitable oxygen donors such as molecular oxygen, peroxides (e.g. $H_2O_2$, $t\text{-}(C_4H_9)OOH$) or peracids (e.g. $CH_3COOOH$) can be used as oxidizing agent. Preferably, the oxidizing agent is an oxygen containing atmosphere. In particular, the oxygen containing atmosphere is air and is preferably constantly passed through the organic substrate (such as an alkane or alkene) at a pressure of 0.01 to 100 bar, preferably 10 to 70 bar.

Moreover, in some embodiments, the oxidation of the organic substrate is preferably carried out at a temperature of 30 to 600° C., preferably 75 to 250° C., preferably 130 to 180° C. In a particularly useful embodiment the oxidation is carried out at a temperature of 100° C. or more, alternately 110° C. or more, alternately 120° C. or more, alternately 130° C. or more, alternately 140° C. or more, alternately 150° C. or more, alternately 160° C. or more, alternately 170° C. or more, alternately 180° C. or more, alternately 190° C. or more, alternately 200° C. or more, alternately 210° C. or more, alternately 220° C. or more.

Prior to their use in oxidation reactions, the present polyoxometalates can be supported on a solid support. Suitable supports include materials having a high surface area and a pore size which is sufficient to allow the polyoxometalates to be loaded, e.g. aerogels of aluminum oxide and magnesium oxide, titanium oxide, zirconium oxide, silica, mesoporous silica (such as SBA-15), active carbon, zeolites and mesoporous zeolites. In another embodiment, the supported polyoxometalates are further calcined at a temperature not exceeding the transformation temperature of the polyoxometalate, i.e. the temperature at which decomposition of the polyoxometalate starts to take place (usually about 500 to 600° C. for the present POMs).

Due to the definite stoichiometry of polyoxometalates, the present POMs can be converted (e.g. by calcination at a temperature exceeding the transformation temperature) to mixed metal oxide catalysts in a highly reproducible manner. Consequently, the polyoxometalates according to the invention can also be used as a precursor for mixed metal oxide catalysts such as so-called Mitsubishi-type catalysts which are particularly useful for the oxidation of hydrocarbons such as propane.

Another useful aspect of this invention is that the polyoxometalates (supported or unsupported) described herein can be recycled and used multiple times for the oxidation of organic molecules.

For example the POMs produced herein can be collected after an oxidation reaction, washed with a polar or non-polar solvent, such as acetone then dried under heat (typically 50° C. or more, alternately 100° C. or more, alternately 125° C. or more, alternately 150° C. or more) for 30 minutes to 48 hours, typically for 1 to 24 hours, more typically for 2 to 10 hours, more typically for 3 to 5 hours. The recycled supported POMs may be used on fresh organic molecules (such as hexadecane) or on recycled organic molecules from a recycle stream.

Advantageously, the supported polyoxometalates may be recycled and used again under the same or different reaction conditions. Typically the supported POMs are recycled at least 1 time, preferably at least 4 times, preferably at least 8 times, preferably at least 12 times, preferably at least 100 times.

Thus, in a particularly useful embodiment, this invention relates to a process to oxidize organic substrates (typically an alkane) comprising contacting a first organic substrate with one or more polyoxometalates described herein, thereafter recovering the polyoxometalates, contacting the polyoxometalates with a solvent (such as acetone) at a temperature of 50° C. or more to obtain a recycled polyoxometalate, thereafter contacting the recycled polyoxometalate with a second organic substrate, which may be the same as or different from the first organic substrate, this process may be repeated many times, preferably at least 4 times, preferably at least 8 times, preferably at least 12 times, preferably at least 100 times.

This invention further relates to:
1. Polyoxometalates represented by the formula I $$(A_n)^{m+}[M_y(H_2O)_pX_zZ_2W_{18}O_{66}]^{m-} \quad (I)$$

or solvates thereof, wherein
A represents a cation,
n is the number of the cations A,
m is the charge of the polyoxoanion,
M represents a transition metal selected from Cu, Zn, Pd, Pt and mixtures thereof,
y is the number of transition metals M and based on all polyoxometalate molecules of a given sample, Y represents an average value of greater than 4 and less than 6 (preferably Y is a number from greater than 4 to less than 6), p is the number of water molecules and varies from 0 to 10 (preferably P is a number from 0 to 10),
X is a halide selected from the group consisting of F, Cl, Br, I and mixtures thereof,
z is the number of halides and varies from 0 to 6 (preferably P is a number from 0 to 6), and
Z represents a heteroatom selected from $Sb^{III}$, $Bi^{III}$, $As^{III}$, $Se^{IV}$ and $Te^{IV}$.

2. The polyoxometalates according to paragraph 1, wherein y has a value of more than 4 and less than 5.
3. The polyoxometalates according to paragraph 1 or 2, wherein y has a value of about 4.5.
4. The polyoxometalates according to paragraph 1, wherein for substantially all polyoxometalate molecules y is 5.
5. The polyoxometalates according to any one of paragraphs 1 to 4, wherein M is Cu.
6. The polyoxometalates according to any one of paragraphs 1 to 5, wherein A is selected from the group consisting of lithium, sodium, potassium, rubidium, cesium, magnesium, calcium, strontium, barium, titanium, vanadium, chromium, lanthanum, lanthanide metal, actinide metal, manganese, iron, cobalt, nickel, copper, zinc, ruthenium, palladium, platinum, tin, antimony, tellurium, phosphonium, ammonium, guanidinium, tetraalkylammonium, protonated aliphatic amines, protonated aromatic amines or combinations thereof.
7. The polyoxometalates according to paragraph 5 or 6, represented by the formula $$(A_n)^{m+}[Cu_y(H_2O)_pX_zZ_2W_{18}O_{66}]^{m-}\cdot xH_2O,$$

wherein x represents the number of hydrate water molecules per polyoxometalate molecule, exclusive of water molecules which are bound as ligands to Cu or optionally A positioned in the framework.
8. A process for the preparation of polyoxometalates of formula (II)

$$(A_n)^{m+}[M_y(H_2O)_pX_zZ_2W_{18}O_{66}] \quad (II)$$

or solvates thereof, wherein
A represents a cation,
n is the number of the cations A,
m is the charge of the polyoxoanion,
M represents a transition metal selected from Cu, Zn, Pd, Pt and mixtures thereof,
y is the number of transition metals M and based on all polyoxometalate molecules of a given sample, Y represents an average value of greater than 4 and less than 6 (preferably Y is a number from greater than 4 to less than 6),
p is the number of water molecules and varies from 0 to 10 (preferably P is a number from 0 to 10),
X is a halide selected from the group consisting of F, Cl, Br, I and mixtures thereof,
z is the number of halides and varies from 0 to 6 (preferably P is a number from 0 to 6), and
Z represents a heteroatom selected from $Sb^{III}$, $Bi^{III}$, $As^{III}$, $Se^{IV}$ and $Te^{IV}$, comprising:
(a) mixing an aqueous solution of a source of M with
(i) a salt of $(\alpha-ZW_9O_{33})^{w-}$ or
(ii) a Z containing starting material and a salt of $WO_4^{2-}$,
(b) heating the mixture obtained in step (a),
(c) optionally cooling the solution obtained in step (b), (d) optionally adding a salt of A and/or a salt of X to the mixture of step (a) or the solution obtained in step (b) or in step (c) to form $(A_n)^{m+}[M_y(H_2O)_pX_zZ_2W_{18}O_{66}]^{m-}$ or a solvate thereof, and (d) optionally recovering the polyoxometalate obtained in step (b), step (c) or step (d), wherein w is the negative charge of the POM-precursor $(\alpha\text{-}ZW_9O_{33})$ and is 9 when $Z=Sb^{III}$, $Bi^{III}$, $As^{III}$ and 8 when $Z=Se^{IV}$, $Te^{IV}$, respectively.

9. The process according to paragraph 8, wherein the polyoxometalates of formula (II) are polyoxometalates of formula (I) according to any one of paragraphs 1 to 7.

10. The process according to paragraph 8 or 9, wherein the source of M is selected from the group consisting of $CuCl_2.2H_2O$, $Cu(CH_3COO)_2$, $ZnCl_2$, $PdCl_2$, $Pd(CH_3COO)_2$, $PdSO_4$, $PtCl_2$, $PtBr_2$, $PtI_2$ and $K_2PtCl_4$ and preferably is $CuCl_2.2H_2O$.

11. The process according to any one of paragraphs 8 to 10, wherein the pH of the aqueous solution used in step (a) ranges from 4.5 to 7.5, preferably from 4.5 to 6.5 and more preferably from 4.5 to 5.5.

12. The process according to paragraph 11, wherein in step (a) an ammonium acetate buffer having a concentration of about 0.5 M is used as aqueous solvent.

13. The process according to any one of paragraphs 8 to 12, wherein in step (a)(i) the molar ratio of transition metal ions originating from the source of M to the salt of $(\alpha\text{-}ZW_9O_{33})^{w-}$ ranges from 1.5:1 to 30:1 and preferably from 2:1 to 15:1.

14. The process according to any one of paragraphs 8 to 13, wherein in step (a) (i) the ammonium salt of $(\alpha\text{-}ZW_9O_{33})^{w-}$ is used.

15. The process according to any one of paragraphs 8 to 14, wherein steps (a) and (b) are performed in the absence of alkali ions.

16. The process according to any one of paragraphs 8 to 15, wherein in step (b) the mixture is heated to a temperature of 50 to 100° C., preferably from 70 to 90° C.

17. The process according to any one of paragraphs 8 to 16, wherein in step (e) the product is isolated by bulk precipitation or crystallization.

18. The use of a polyoxometalate according to any one of paragraphs 1 to 7 or prepared according to any one of paragraphs 8 to 17 as catalyst for the homogeneous or heterogeneous oxidation of organic substrates.

19. The use according to paragraph 18, wherein the organic substrates are unsubstituted or substituted hydrocarbons such as branched or unbranched alkanes and alkenes having carbon numbers from C1 to C20, cycloalkanes, cycloalkenes, aromatic hydrocarbons or mixtures thereof.

20. The use according to paragraph 18 or 19, wherein the polyoxometalate is supported on a solid support.

21. The use according to paragraph 20, wherein the supported polyoxometalate is calcined at a temperature not exceeding the transformation temperature of the polyoxometalate.

22. The use of a polyoxometalate according to any one of paragraphs 1 to 7 or prepared according to any one of paragraphs 8 to 17 as a precursor for preparing mixed metal oxide catalysts.

23. The use according to paragraph 22, wherein the mixed metal oxide catalysts are Mitsubishi-type catalysts.

24. A process of oxidizing an organic substrate comprising contacting a polyoxometalate according to any one of paragraphs 1 to 7 or prepared according to any one of paragraphs 8 to 17 as catalyst with an organic substrate.

25. The process of paragraph 24 wherein the organic substrate is unsubstituted or substituted hydrocarbons such as branched or unbranched alkanes and alkenes having carbon numbers from C1 to C20, cycloalkanes, cycloalkenes, aromatic hydrocarbons or mixtures thereof.

26. The process of paragraph 24 or 25, wherein the polyoxometalate is supported on a solid support.

27. The process of paragraph 26, wherein the supported polyoxometalate is calcined at a temperature not exceeding the transformation temperature of the polyoxometalate.

28. The process of any of paragraphs 24 to 27 wherein an oxygen donor is present during the oxidation.

29. The process of paragraph 28 wherein air is constantly passed through the organic substrate during the oxidation.

30. The process of any of paragraphs 24 to 29 wherein the oxidation takes place at a temperature of 30 to 600° C.

31. The process of any of paragraphs 24 to 29 further comprising 1) recovering the polyoxometalates, 2) contacting the polyoxometalates with a solvent at a temperature of 50° C. or more to obtain a recycled polyoxometalate, 3) thereafter contacting the recycled polyoxometalate with a second organic substrate, which may be the same or different than the first organic substrate.

32. The process of paragraph 31 wherein the polyoxometalate is recycled at least 4 times, preferably at least 8 times, preferably at least 12 times, preferably at least 100 times.

The invention is further illustrated by the following examples.

Example 1

$Na(NH_4)_{8.5}[Cu_{4.5}(H_2O)_4Cl_{0.5}(AsW_9O_{33})_2].11H_2O$

A 0.31 g (0.13 mmol) sample of $(NH_4)_9[AsW_9O_{33}]$ was added with stirring to a solution of 0.22 g (1.30 mmol) $CuCl_2.H_2O$ in 20 mL of a 0.5 M $NH_4OAc$ buffer (pH 4.8). This solution was heated to 80° C. for 1 h and then cooled to room temperature and filtered. Addition of a few drops of 0.1 M NaCl and slow evaporation in an open vial resulted in 0.23 g (yield 68%) of green crystalline material suitable for X-ray diffraction.

IR (cm-1): 1400, 968(sh), 948, 904, 862(sh), 789(sh), 749 (sh), 736, 629, 568, 484, 453 (measured on a Nicolet-Avatar 370 spectrometer using KBr pellets).

Besides IR the product was also characterized by single crystal XRD. The crystal data and structure refinement obtained on a Bruker Kappa APEX II instrument using the SHELXTL software package are shown in the following table.

TABLE 1

Crystal data and structure refinement for
$Na(NH_4)_{8.5}[Cu_{4.5}(H_2O)_4Cl_{0.5}(AsW_9O_{33})_2]\cdot 11H_2O$.

| | |
|---|---|
| Empirical formula | $As_2Cl_{0.5}Cu_{4.5}H_{64}N_{8.5}NaO_{81}W_{18}$ |
| Formula weight | 5265.5 |
| Temperature | 173(2) K |
| Wavelength | 0.71073 Å |
| Crystal system | Tetragonal |
| Space group | P-42(1)m |
| Unit cell dimensions | a = 16.8113(14) Å α = 90°. |
| | b = 16.8113(14) Å β = 90°. |
| | c = 13.9215(16) Å γ = 90°. |
| Volume | 3934.5(6) Å³ |
| Z | 2 |
| Density (calculated) | 4.398 Mg/m³ |
| Absorption coefficient | 28.359 mm⁻¹ |
| F(000) | 4520 |
| Crystal size | 0.05 × 0.06 × 0.09 mm³ |
| Theta range for data collection | 1.71 to 28.32°. |
| Index ranges | −22 <= h <= 22, −22 <= k <= 22, |

TABLE 1-continued

Crystal data and structure refinement for
Na(NH$_4$)$_{8.5}$[Cu$_{4.5}$(H$_2$O)$_4$Cl$_{0.5}$(AsW$_9$O$_{33}$)$_2$]•11H$_2$O.

| | |
|---|---|
| | $-18 <= 1 <= 18$ |
| Reflections collected | 41736 |
| Independent reflections | 5128 [R(int) = 0.0827] |
| Completeness to theta = 28.32° | 99.8% |
| Absorption correction | Semi-empirical from equivalents |
| Max. and min. transmission | 0.2628 and 0.1598 |
| Refinement method | Full-matrix least-squares on F$^2$ |
| Data/restraints/parameters | 5128/0/174 |
| Goodness-of-fit on F$^2$ | 1.004 |
| Final R indices [I > 2sigma(I)] | R1 = 0.0371, wR2 = 0.0667 |
| R indices (all data) | R1 = 0.0442, wR2 = 0.0682 |
| Absolute structure parameter | 0.02(2) |
| Largest diff. peak and hole | 1.904 and −1.937 e · Å$^{-3}$ |

The atomic coordinates as well as the equivalent isotropic displacement parameters which are defined as one third of the trace of the orthogonalized U$^{ij}$ tensor are shown in Table 2.

TABLE 2

Atomic coordinates x, y and z (·10$^4$ Å) and equivalent isotropic displacement parameters U(eq) (·10$^3$ Å$^2$) for Na(NH$_4$)$_{8.5}$[Cu$_{4.5}$(H$_2$O)$_4$Cl$_{0.5}$(AsW$_9$O$_{33}$)$_2$]•11H$_2$O.

| | x | y | z | U(eq) |
|---|---|---|---|---|
| W(1) | 3007(1) | 581(1) | −298(1) | 14(1) |
| W(2) | 2954(1) | 504(1) | 4077(1) | 15(1) |
| W(3) | 2243(1) | −193(1) | 1987(1) | 14(1) |
| W(4) | 2540(1) | 2460(1) | 386(1) | 16(1) |
| W(5) | 1775(1) | 1668(1) | 2696(1) | 16(1) |
| As(1) | 3885(1) | 1115(1) | 1915(2) | 11(1) |
| Cu(1) | 5000 | 0 | 3924(3) | 16(1) |
| Cu(2) | 3977(1) | −1023(1) | 908(2) | 14(1) |
| Cu(3) | 5000 | 0 | −36(6) | 29(2) |
| Cu(4) | 4012(3) | −988(3) | 2898(5) | 45(2) |
| Cl(1) | 5000 | 0 | 5779(14) | 46(5) |
| Na(1) | 0 | 0 | 5000 | 36(3) |
| O(1) | 884(5) | 2108(5) | 2987(7) | 21(2) |
| O(2) | 2477(5) | 2523(5) | 3030(10) | 22(3) |
| O(3) | 3200(5) | −677(5) | 1828(6) | 15(2) |
| O(4) | 3559(5) | 1441(5) | 4307(9) | 12(3) |
| O(5) | 1593(6) | −947(6) | 1798(7) | 24(2) |
| O(6) | 5000 | 0 | −1568(18) | 47(7) |
| O(7) | 2322(5) | −258(5) | 3363(6) | 16(2) |
| O(8) | 3509(5) | 1491(5) | 823(9) | 14(3) |
| O(9) | 3777(5) | 1223(5) | −989(9) | 12(3) |
| O(10) | 2331(5) | 248(5) | 746(6) | 16(2) |
| O(11) | 1872(6) | 3128(6) | −94(9) | 20(3) |
| O(12) | 2598(6) | 80(6) | −1252(7) | 21(2) |
| O(13) | 1431(5) | 650(5) | 2232(6) | 17(2) |
| O(14) | 2752(6) | 185(6) | 5226(7) | 23(2) |
| O(15) | 2025(5) | 1204(5) | 3914(6) | 13(2) |
| O(16) | 4085(5) | 2064(5) | 2479(5) | 12(2) |
| O(17) | 3852(5) | −13(6) | 3772(7) | 18(2) |
| O(18) | 1890(5) | 2003(5) | 1372(6) | 18(2) |
| O(19) | 2320(5) | 1551(5) | −352(7) | 17(2) |
| O(20) | 3794(5) | −101(6) | 139(6) | 17(2) |
| O(1W) | 3825(7) | −1175(7) | 8069(15) | 52(5) |
| O(2W) | 866(7) | 1108(7) | 5323(8) | 42(3) |
| O(3W) | 2460(10) | −2540(10) | 2256(19) | 106(9) |
| O(4W) | 1356(13) | 3644(13) | 4130(20) | 123(10) |
| O(5W) | 0 | 0 | 3177(13) | 48(5) |
| O(6W) | 3834(9) | 1166(9) | −3045(18) | 84(7) |
| O(7W) | 747(7) | 912(7) | 178(8) | 41(3) |
| O(8W) | 3271(10) | −1729(10) | 3633(16) | 89(8) |
| O(9W) | 1935(9) | 760(9) | 6903(12) | 9(3) |

Example 2

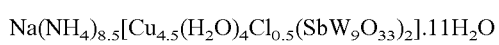

Na(NH$_4$)$_{8.5}$[Cu$_{4.5}$(H$_2$O)$_4$Cl$_{0.5}$(SbW$_9$O$_{33}$)$_2$].11H$_2$O

Example 1 was repeated with the exception that instead of 0.31 g (0.13 mmol) of (NH$_4$)$_9$[AsW$_9$O$_{33}$] 0.32 g (0.13 mmol) of (NH$_4$)$_9$[SbW$_9$O$_{33}$] was used. The yield obtained was 0.24 g (69%) of green crystalline material suitable for X-ray diffraction.

IR (cm-1): 1402, 944, 897, 848, 773(sh), 731, 638, 568, 476, 447 (measured on a Nicolet-Avatar 370 spectrometer using KBr pellets).

The crystal data and structure refinement obtained on a Bruker Kappa APEX II instrument using the SHELXTL software package are shown in the following table.

TABLE 3

Crystal data and structure refinement for
Na(NH$_4$)$_{8.5}$[Cu$_{4.5}$(H$_2$O)$_4$Cl$_{0.5}$(SbW$_9$O$_{33}$)$_2$]•11H$_2$O.

| | |
|---|---|
| Empirical formula | Cl$_{0.5}$Cu$_{4.5}$H$_{64}$N$_{8.5}$NaO$_{81}$Sb$_2$W$_{18}$ |
| Formula weight | 5359.2 |
| Temperature | 173(2) K |
| Wavelength | 0.71073 Å |
| Crystal system | Tetragonal |
| Space group | P-42(1)m |
| Unit cell dimensions | a = 16.8129(9) Å  α = 90°. |
| | b = 16.8129(9) Å  β = 90°. |
| | c = 13.9898(11) Å  γ = 90°. |
| Volume | 3954.5(4) Å$^3$ |
| Z | 2 |
| Density (calculated) | 4.454 Mg/m$^3$ |
| Absorption coefficient | 28.054 mm$^{-1}$ |
| F(000) | 4592 |
| Crystal size | 0.08 × 0.08 × 0.09 mm$^3$ |
| Theta range for data collection | 1.89 to 28.30°. |
| Index ranges | $-22 <= h <= 22$, $-22 <= k <= 22$, |
| | $-18 <= 1 <= 18$ |
| Reflections collected | 42047 |
| Independent reflections | 5155 [R(int) = 0.0757] |
| Completeness to theta = 28.30° | 99.9% |
| Absorption correction | Semi-empirical from equivalents |
| Max. and min. transmission | 0.2627 and 0.1615 |
| Refinement method | Full-matrix least-squares on F$^2$ |
| Data/restraints/parameters | 5155/0/174 |
| Goodness-of-fit on F$^2$ | 1.019 |
| Final R indices [I > 2sigma(I)] | R1 = 0.0364, wR2 = 0.0757 |
| R indices (all data) | R1 = 0.0406, wR2 = 0.0771 |
| Absolute structure parameter | 0.020(16) |
| Largest diff. peak and hole | 2.060 and −2.716 e · Å$^{-3}$ |

The atomic coordinates as well as the equivalent isotropic displacement parameters which are defined as one third of the trace of the orthogonalized U$^{ij}$ tensor are shown in Table 4.

TABLE 4

Atomic coordinates x, y and z (·10$^4$ Å) and equivalent isotropic displacement parameters U(eq) (·10$^3$ Å$^2$) for Na(NH$_4$)$_{8.5}$[Cu$_{4.5}$(H$_2$O)$_4$Cl$_{0.5}$(SbW$_9$O$_{33}$)$_2$]•11H$_2$O.

| | x | y | z | U(eq) |
|---|---|---|---|---|
| W(1) | −3007(1) | −587(1) | −9699(1) | 12(1) |
| W(2) | −2946(1) | −499(1) | −14062(1) | 14(1) |
| W(3) | −2235(1) | 193(1) | −11988(1) | 13(1) |
| W(4) | −2548(1) | −2453(1) | −10387(1) | 14(1) |
| W(5) | −1783(1) | −1657(1) | −12690(1) | 14(1) |
| Sb(1) | −3980(1) | −1020(1) | −11911(1) | 9(1) |
| Cu(1) | −5000 | 0 | −13939(2) | 13(1) |
| Cu(2) | −3962(1) | 1038(1) | −10891(2) | 12(1) |
| Cu(3) | −5000 | 0 | −9957(7) | 43(2) |
| Cu(4) | −3987(3) | 1013(3) | −12887(6) | 52(2) |
| Na(1) | 0 | 0 | −15000 | 37(3) |
| Cl(1) | −5000 | 0 | −15739(13) | 38(4) |
| O(1) | −894(5) | −2118(6) | −12973(7) | 21(2) |
| O(2) | −2502(5) | −2498(5) | −13020(10) | 19(3) |
| O(3) | −3193(5) | 680(5) | −11824(7) | 17(2) |
| O(4) | −3551(5) | −1449(5) | −14281(9) | 14(3) |
| O(5) | −1572(5) | 953(6) | −11788(7) | 20(2) |

TABLE 4-continued

Atomic coordinates x, y and z ($\cdot 10^4$ Å) and equivalent isotropic displacement parameters U(eq) ($\cdot 10^3$ Å$^2$) for Na(NH$_4$)$_{8.5}$[Cu$_{4.5}$(H$_2$O)$_4$Cl$_{0.5}$(SbW$_9$O$_{33}$)$_2$]•11H$_2$O.

| | x | y | z | U(eq) |
|---|---|---|---|---|
| O(6) | −5000 | 0 | −8451(19) | 50(7) |
| O(7) | −2311(5) | 273(5) | −13361(6) | 14(2) |
| O(8) | −3520(5) | −1480(5) | −10774(9) | 14(3) |
| O(9) | −3790(5) | −1210(5) | −9004(9) | 13(3) |
| O(10) | −2336(5) | −255(5) | −10749(6) | 12(2) |
| O(11) | −1865(6) | −3135(6) | −9936(10) | 22(3) |
| O(12) | −2602(6) | −77(6) | −8760(7) | 23(2) |
| O(13) | −1407(5) | −645(5) | −12236(6) | 14(2) |
| O(14) | −2759(6) | −179(6) | −15208(7) | 23(2) |
| O(15) | −2022(5) | −1194(5) | −13912(6) | 12(2) |
| O(16) | −4115(5) | −2091(5) | −12500(6) | 13(2) |
| O(17) | −3847(6) | 9(6) | −13731(7) | 17(2) |
| O(18) | −1921(6) | −1998(6) | −11386(7) | 17(2) |
| O(19) | −2311(5) | −1563(5) | −9627(7) | 17(2) |
| O(20) | −3785(6) | 94(6) | −10150(7) | 19(2) |
| O(1W) | −3821(8) | 1179(8) | −18113(15) | 50(5) |
| O(2W) | −1930(9) | −767(9) | −16883(12) | 6(3) |
| O(3W) | −871(7) | −1082(7) | −15331(9) | 39(3) |
| O(4W) | −2460(10) | 2540(10) | −12207(18) | 81(7) |
| O(5W) | −1360(14) | −3640(14) | −14050(20) | 125(12) |
| O(6W) | 0 | 0 | −13187(14) | 51(5) |
| O(7W) | −3808(9) | −1192(9) | −6951(18) | 73(7) |
| O(8W) | −748(7) | −922(7) | −10199(9) | 41(3) |
| O(9W) | −3281(11) | 1719(11) | −13568(18) | 86(8) |

Example 3

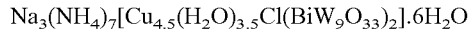

Na$_3$(NH$_4$)$_7$[Cu$_{4.5}$(H$_2$O)$_{3.5}$Cl(BiW$_9$O$_{33}$)$_2$]·6H$_2$O

A 0.34 g (0.13 mmol) sample of Na$_9$[BiW$_9$O$_{33}$] was added with stirring to a solution of 0.22 g (1.30 mmol) CuCl$_2$·H$_2$O in 20 mL of a 0.5 M NH$_4$OAc buffer (pH 4.8). This solution was heated to 80° C. for 1 h and then cooled to room temperature and filtered. Slow evaporation in an open vial resulted in 0.24 g (yield 67%) of green crystalline material suitable for X-ray diffraction.

IR (cm$^{-1}$): 1402, 940, 889, 836, 760(sh), 722, 649(sh), 566, 502, 438 (measured on a Nicolet-Avatar 370 spectrometer using KBr pellets).

The crystal data and structure refinement obtained on a Bruker Kappa APEX II instrument using the SHELXTL software package are shown in the following table.

TABLE 5

Crystal data and structure refinement for Na$_3$(NH$_4$)$_7$[Cu$_{4.5}$(H$_2$O)$_{3.5}$Cl(BiW$_9$O$_{33}$)$_2$]•6H$_2$O.

| | |
|---|---|
| Empirical formula | Bi$_2$ClCu$_{4.5}$H$_{47}$N$_7$Na$_3$O$_{75.5}$W$_{18}$ |
| Formula weight | 5471.2 |
| Temperature | 173(2) K |
| Wavelength | 0.71073 Å |
| Crystal system | Tetragonal |
| Space group | P-42(1)m |
| Unit cell dimensions | a = 16.8295(4) Å α = 90°. |
| | b = 16.8295(4) Å β = 90°. |
| | c = 13.7918(6) Å γ = 90°. |
| Volume | 3906.3(2) Å$^3$ |
| Z | 2 |
| Density (calculated) | 4.600 Mg/m$^3$ |
| Absorption coefficient | 32.170 mm$^{-1}$ |
| F(000) | 4651 |
| Crystal size | 0.20 × 0.05 × 0.05 mm$^3$ |
| Theta range for data collection | 1.48 to 26.39°. |
| Index ranges | −21 <= h <= 21, −21 <= k <= 21, −13 <= l <= 17 |

TABLE 5-continued

Crystal data and structure refinement for Na$_3$(NH$_4$)$_7$[Cu$_{4.5}$(H$_2$O)$_{3.5}$Cl(BiW$_9$O$_{33}$)$_2$]•6H$_2$O.

| | |
|---|---|
| Reflections collected | 62884 |
| Independent reflections | 4196 [R(int) = 0.1424] |
| Completeness to theta = 26.39° | 99.7% |
| Absorption correction | Semi-empirical from equivalents |
| Max. and min. transmission | 0.2961 and 0.1130 |
| Refinement method | Full-matrix least-squares on F$^2$ |
| Data/restraints/parameters | 4196/0/156 |
| Goodness-of-fit on F$^2$ | 1.038 |
| Final R indices [I > 2sigma(I)] | R1 = 0.0421, wR2 = 0.1192 |
| R indices (all data) | R1 = 0.0495, wR2 = 0.1339 |
| Absolute structure parameter | −0.02(2) |
| Largest diff. peak and hole | 12.518 and −2.444 e · Å$^{-3}$ |

The atomic coordinates as well as the equivalent isotropic displacement parameters which are defined as one third of the trace of the orthogonalized U$^{ij}$ tensor are shown in Table 6.

TABLE 6

Atomic coordinates x, y and z ($\cdot 10^4$ Å) and equivalent isotropic displacement parameters U(eq) ($\cdot 10^3$ Å$^2$) for Na$_3$(NH$_4$)$_7$[Cu$_{4.5}$(H$_2$O)$_{3.5}$Cl(BiW$_9$O$_{33}$)$_2$]•6H$_2$O.

| | x | y | z | U(eq) |
|---|---|---|---|---|
| W(1) | 3352(1) | 3203(1) | 2710(1) | 17(1) |
| W(2) | 4503(1) | 2050(1) | 4088(1) | 17(1) |
| W(3) | 5189(1) | 2766(1) | 2001(1) | 16(1) |
| W(4) | 4405(1) | 1994(1) | −319(1) | 15(1) |
| W(5) | 2555(1) | 2445(1) | 373(1) | 16(1) |
| Bi(1) | 4041(1) | 959(1) | 1915(1) | 14(1) |
| Cu(1) | 5000 | 0 | 3977(4) | 18(1) |
| Cu(2) | 6043(2) | 1043(2) | 874(3) | 14(1) |
| Cu(3) | 6332(3) | 1332(3) | 3188(4) | 20 |
| Cl(1) | 5000 | 0 | 5862(15) | 66(5) |
| O(1T) | 2903(9) | 4083(9) | 3007(11) | 23(3) |
| O(1A) | 2515(8) | 2485(8) | 3050(14) | 15(4) |
| O(2A) | 4855(10) | 2218(10) | 5245(12) | 27(4) |
| O(2T) | 3544(9) | 1456(9) | 4323(16) | 21(5) |
| O(3T) | 5953(9) | 3449(9) | 1794(10) | 19(3) |
| O(4A) | 3800(9) | 1200(9) | −1077(14) | 16(4) |
| O(4T) | 4947(10) | 2428(10) | −1271(11) | 22(3) |
| O(5A) | 2310(8) | 1532(8) | −427(10) | 15(3) |
| O(5T) | 1890(8) | 3110(8) | −63(14) | 17(4) |
| O(1B1) | 4123(8) | 2114(8) | 2516(9) | 9(3) |
| O(12) | 3804(10) | 2997(10) | 3975(11) | 25(3) |
| O(13) | 4366(10) | 3593(9) | 2290(12) | 24(3) |
| O(15) | 3020(9) | 3068(9) | 1393(12) | 23(3) |
| O(2B1) | 3502(8) | 1498(8) | 724(14) | 14(4) |
| O(2C1) | 5013(10) | 1136(10) | 3741(11) | 23(3) |
| O(23) | 5308(9) | 2677(9) | 3403(10) | 17(3) |
| O(3C2) | 5645(9) | 1777(9) | 1854(11) | 23(3) |
| O(34) | 4730(8) | 2655(9) | 734(10) | 17(3) |
| O(4C2) | 5056(9) | 1227(9) | 151(10) | 19(3) |
| Na(1) | 6011(15) | 1011(15) | 2940(20) | 20 |
| Na(2) | 5000 | 0 | −655(12) | 20 |
| Na(3) | 5000 | 5000 | 5000 | 39(5) |
| O(1W) | 5000 | 5000 | 6800(20) | 44(7) |
| O(2W) | 5841(11) | 3906(11) | 4670(13) | 36(4) |
| O(3W) | 5758(12) | 4073(12) | −195(15) | 43(5) |
| O(4W) | 3070(14) | 5738(14) | 3088(17) | 55(5) |
| O(5W) | 6149(15) | 1149(15) | −1890(20) | 58(8) |

All documents described herein are incorporated by reference herein, including any priority documents and/or testing procedures, except to the extent they are inconsistent with this specification. As is apparent from the foregoing general description and the specific embodiments, while forms of the invention have been illustrated and described, various modifications can be made without departing from the spirit and scope of the invention. Accordingly, it is not intended that the

The invention claimed is:

1. Polyoxometalates represented by the formula I $$(A_n)^{m+}[M_y(H_2O)_pX_zZ_2W_{18}O_{66}]^{m-} \quad (I)$$

or hydrates thereof, wherein
A represents a cation selected from the group consisting of lithium, sodium, potassium, rubidium, cesium, magnesium, calcium, strontium, barium, titanium, vanadium, chromium, lanthanum, lanthanide metal, actinide metal, manganese, iron, cobalt, nickel, copper, zinc, ruthenium, palladium, platinum, tin, antimony, tellurium, phosphonium, ammonium, guanidinium, tetraalkylammonium, protonated aliphatic amines, protonated aromatic amines and combinations thereof,
n is the number of the cations A,
m is the charge of the polyoxoanion,
M represents a transition metal selected from Cu, Zn, Pd, Pt and mixtures thereof,
y is the number of transition metals M and is a number from greater than 4 to less than 6,
p is the number of water molecules and is a number from 0 to 10,
X is a halide selected from the group consisting of F, Cl, Br, I and mixtures thereof,
z is the number of halides and is a number from 0 to 6 and
Z represents a heteroatom selected from $Sb^{III}$, $Bi^{III}$, $As^{III}$, $Se^{IV}$ and $Te^{IV}$.

2. The polyoxometalates of claim 1, wherein y has a value of more than 4 and less than or equal to 5.

3. The polyoxometalates of claim 1, wherein y has a value of about 4.5.

4. The polyoxometalates of claim 1, wherein for substantially all polyoxometalate molecules y is 5.

5. The polyoxometalates of claim 1, wherein M is Cu.

6. The polyoxometalates of claim 1 wherein A is selected from the group consisting of sodium, potassium, and ammonium, and combinations thereof.

7. A hydrate of the polyoxometalates of claim 1, represented by the formula $$(A_n)^{m+}[Cu_y(H_2O)_pX_zZ_2W_{18}O_{66}]^{m-} \cdot xH_2O,$$

wherein x represents the number of hydrate water molecules per polyoxometalate molecule, exclusive of water molecules which are bound as ligands to Cu or optionally A positioned in the framework, and wherein A, n, m, y, p, z, and Z are as defined in claim 1.

8. A process for the preparation of polyoxometalates represented by the formula:

$$(A_n)^{m+}[M_y(H_2O)_pX_zZ_2W_{18}O_{66}]^{m-} \quad (II)$$

or hydrates thereof, wherein
A represents a cation selected from the group consisting of lithium, sodium, potassium, rubidium, cesium, magnesium, calcium, strontium, barium, titanium, vanadium, chromium, lanthanum, lanthanide metal, actinide metal, manganese, iron, cobalt, nickel, copper, zinc, ruthenium, palladium, platinum, tin, antimony, tellurium, phosphonium, ammonium, guanidinium, tetraalkylammonium, protonated aliphatic amines, protonated aromatic amines and combinations thereof,
n is the number of the cations A,
m is the charge of the polyoxoanion,
M represents a transition metal selected from Cu, Zn, Pd, Pt and mixtures thereof,
y is the number of transition metals M and is a number from greater than 4 to less than or equal to 6,
p is the number of water molecules and is a number from 0 to 10,
X is a halide selected from the group consisting of F, Cl, Br, I and mixtures thereof,
z is the number of halides and is a number from 0 to 6 and
Z represents a heteroatom selected from $Sb^{III}$, $Bi^{III}$, $As^{III}$, $Se^{IV}$ and $Te^{IV}$,
comprising:
(a) mixing an aqueous solution of a source of M with
  (i) a salt of $(\alpha-ZW_9O_{33})^{w-}$ or
  (ii) a Z containing starting material and a salt of $WO_4^{2-}$,
(b) heating the mixture obtained in step (a),
(c) optionally cooling the solution obtained in step (b),
(d) optionally adding a salt of A and/or a salt of X to the mixture of step (a) or the solution obtained in step (b) or in step (c) to form $(A_n)^{m+}[M_y(H_2O)_pX_zZ_2W_{18}O_{66}]^{m-}$ or a solvate thereof, and
(d) optionally recovering the polyoxometalate obtained in step (b), step (c) or step (d),
wherein w is the negative charge of the POM-precursor $(\alpha-ZW_9O_{33})$ and is 9 when $Z=Sb^{III}$, $Bi^{III}$, $As^{III}$ and 8 when $Z=Se^{IV}$, $Te^{IV}$, respectively.

9. The process of claim 8, wherein the polyoxometalates of formula (II) are polyoxometalates represented by the formula I $$(A_n)^{m+}[M_y(H_2O)_pX_zZ_2W_{18}O_{66}]^{m-} \quad (I)$$

or hydrates thereof, wherein
A represents a cation selected from the group consisting of lithium, sodium, potassium, rubidium, cesium, magnesium, calcium, strontium, barium, titanium, vanadium, chromium, lanthanum, lanthanide metal, actinide metal, manganese, iron, cobalt, nickel, copper, zinc, ruthenium, palladium, platinum, tin, antimony, tellurium, phosphonium, ammonium, guanidinium, tetraalkylammonium, protonated aliphatic amines, protonated aromatic amines and combinations thereof,
n is the number of the cations A,
m is the charge of the polyoxoanion,
M represents a transition metal selected from Cu, Zn, Pd, Pt and mixtures thereof,
y is the number of transition metals M and is a number from greater than 4 to less than 6,
p is the number of water molecules and is a number from 0 to 10,
X is a halide selected from the group consisting of F, Cl, Br, I and mixtures thereof,
z is the number of halides and is a number from 0 to 6 and
Z represents a heteroatom selected from $Sb^{III}$, $Bi^{III}$, $As^{III}$, $Se^{IV}$ and $Te^{IV}$.

10. The process of claim 8, wherein the source of M is selected from the group consisting of $CuCl_2 \cdot 2H_2O$, $Cu(CH_3COO)_2$, $ZnCl_2$, $PdCl_2$, $Pd(CH_3COO)_2$, $PdSO_4$, $PtCl_2$, $PtBr_2$, $PtI_2$ and $K_2PtCl_4$.

11. The process of claim 8, wherein the pH of the aqueous solution used in step (a) ranges from 4.5 to 7.5.

12. The process of claim 11, wherein in step (a) an ammonium acetate buffer having a concentration of about 0.5 M is used as aqueous solvent.

13. The process of claim 8, wherein in step (a)(i) the molar ratio of transition metal ions originating from the source of M to the salt of $(\alpha-ZW_9O_{33})^{w-}$ ranges from 1.5:1 to 30:1.

14. The process of claim 8, wherein in step (a)(i) the ammonium salt of $(\alpha-ZW_9O_{33})^{w-}$ is used.

15. The process of claim 8, wherein steps (a) and (b) are performed in the absence of alkali ions.

16. The process of claim 8, wherein in step (b) the mixture is heated to a temperature of 50 to 100° C.

17. The process of claim 8, wherein in step (e) the product is isolated by bulk precipitation or crystallization.

18. The process of claim 8, wherein the pH of the aqueous solution used in step (a) ranges from 4.5 to 6.5.

19. The process of claim 8, wherein the pH of the aqueous solution used in step (a) ranges from 4.5 to 5.5.

20. The process of claim 8, wherein the source of M is $CuCl_2 \cdot 2H_2O$.

21. The process of claim 8, wherein in step (a)(i) the molar ratio of transition metal ions originating from the source of M to the salt of $(\alpha\text{-}ZW_9O_{33})^{w-}$ ranges from 2:1 to 15:1.

22. A process to prepare a mixed metal oxide catalyst comprising calcining the polyoxometalates of claim 1 at a temperature exceeding the transformation temperature of the polyoxometalates.

23. The process of claim 22, wherein the mixed metal oxide catalysts are Mitsubishi-type catalysts.

* * * * *